(12) United States Patent
Furui et al.

(10) Patent No.: US 7,474,947 B2
(45) Date of Patent: Jan. 6, 2009

(54) VEHICLE CUSTOMIZING SYSTEM

(75) Inventors: Takayuki Furui, Utsunomiya (JP);
Toshibumi Shiohata, Utsunomiya (JP);
Yoshiaki Murata, Tochigi-ken (JP);
Koji Yamaoka, Utsunomiya (JP);
Masayuki Yamazaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 11/099,371

(22) Filed: Apr. 4, 2005

(65) Prior Publication Data
US 2005/0222726 A1 Oct. 6, 2005

(30) Foreign Application Priority Data
Apr. 6, 2004 (JP) ............................. 2004-112605

(51) Int. Cl.
*G06F 17/10* (2006.01)
(52) U.S. Cl. ........................ 701/36; 340/507; 340/508; 348/76
(58) Field of Classification Search .................. 701/36, 701/29, 33; 340/507, 508; 348/76; G06F 11/08
See application file for complete search history.

(56) References Cited

U.S. PATENT DOCUMENTS

| | | | | |
|---|---|---|---|---|
| 5,467,272 A | * | 11/1995 | Yoshida et al. ................. 701/1 |
| 6,128,560 A | * | 10/2000 | Ishii ............................. 701/29 |
| 6,275,231 B1 | * | 8/2001 | Obradovich ................. 345/156 |
| 6,366,839 B1 | * | 4/2002 | Sato ............................. 701/29 |
| 6,556,900 B1 | * | 4/2003 | Brynielsson ................. 701/29 |
| 6,577,934 B2 | * | 6/2003 | Matsunaga et al. ............ 701/29 |
| 6,587,769 B2 | * | 7/2003 | Otterbach et al. ............. 701/45 |
| 6,611,781 B1 | * | 8/2003 | Gutmann ...................... 702/148 |
| 6,775,609 B2 | * | 8/2004 | Ozeki et al. ................. 701/114 |
| 6,961,536 B2 | * | 11/2005 | Himmel et al. ............ 455/3.01 |
| 6,975,932 B2 | * | 12/2005 | Obradovich ................. 701/96 |
| 6,982,635 B2 | * | 1/2006 | Obradovich ................. 340/439 |
| 6,990,404 B2 | * | 1/2006 | Takeuchi ...................... 701/114 |
| 7,127,723 B2 | * | 10/2006 | Endo et al. ................... 719/319 |
| 2002/0058566 A1 | | 5/2002 | Heim |
| 2002/0069002 A1 | * | 6/2002 | Morehouse ................... 701/35 |
| 2002/0072837 A1 | * | 6/2002 | Eichenseher et al. .......... 701/34 |
| 2002/0085043 A1 | * | 7/2002 | Ribak .......................... 345/810 |
| 2002/0197976 A1 | | 12/2002 | Liu et al. |
| 2003/0004616 A1 | * | 1/2003 | Obradovich et al. ............ 701/1 |

FOREIGN PATENT DOCUMENTS

DE 10052881 5/2002

(Continued)

*Primary Examiner*—Tuan C To
(74) *Attorney, Agent, or Firm*—O'Melveny & Myers LLP

(57) ABSTRACT

A vehicle customizing system is highly reliable in the event of communication failures. For setting control characteristic values pertaining to functions of control units to control characteristic values favored by the user, the functions and the present control characteristic values set for the functions are displayed on a display unit. The control characteristic values, which are changed using the display unit, are stored in first function information tables of the control units, which directly perform the functions. Even in the event of a communication failure, the control units are capable, on their own, of controlled objects in order to perform the functions thereof based on the control characteristic values stored in the first function information tables.

15 Claims, 22 Drawing Sheets

FOREIGN PATENT DOCUMENTS

| | | |
|---|---|---|
| JP | 03-258633 | 11/1991 |
| JP | 10-264739 | 10/1998 |
| JP | 11-265627 | 9/1999 |
| JP | 11-310094 | 11/1999 |
| JP | 11-311037 | 11/1999 |
| JP | 2000-016203 | 1/2000 |
| JP | 2002-102099 | 1/2002 |
| JP | 20002-325085 | 11/2002 |

* cited by examiner

FIG. 2A 31A 1ST FUNCTION INFORMATION TABLE (DOOR LOCK CONTROL UNIT 18A)

| MENU NUMBER (ITEM NUMBER) | CUSTOMIZED OBJECT FUNCTION | | | CONTROL CHARACTERISTIC VALUES | | | FUNCTION PRESENCE/ ABSENCE |
|---|---|---|---|---|---|---|---|
| | FUNCTION NAME | CONTROL CHARACTERISTICS | SETTING NUMBER | USER IDENTIFICATION | | | |
| | | | | 0 | 1 | 2 | |
| 1 | AUTOMATIC DOOR LOCK | NONE | 0 | 0 | 2 | 1 | 1 (PRESENCE) |
| | | PARKING-INTERLOCKED | 1 | | | | |
| | | VEHICLE-SPEED-INTERLOCKED | 2 | | | | |
| 2 | PASSENGER COMPARTMENT LAMP ENERGIZATION TIME | 15 sec | 0 | 1 | 2 | 0 | 1 (PRESENCE) |
| | | 30 sec | 1 | | | | |
| | | 60 sec | 2 | | | | |
| 3 | AUTOMATIC DOOR UNLOCK | NONE | 0 | 0 | 0 | 2 | 1 (PRESENCE) |
| | | PARKING-INTERLOCKED | 1 | | | | |
| | | IGN. OFF-INTERLOCKED | 2 | | | | |
| ... | ... | ... | ... | ... | ... | ... | ... |

31Aa CUSTOMIZED OBJECT FUNCTION TABLE (DATA AREA)
31Ab CONTROL CHARACTERISTIC TABLE AREA
31Ac FUNCTION PRESENCE/ABSENCE DATA AREA

FIG. 2B

31Am 1ST FUNCTION INFORMATION TABLE AS MINIMUM UNIT

| MENU NUMBER (ITEM NUMBER) | CONTROL CHARACTERISTIC VALUES | | | FUNCTION PRESENCE/ABSENCE |
|---|---|---|---|---|
| | | USER IDENTIFICATION CODE | | |
| | 0 | 1 | 2 | |
| 1 | 0 | 1 | 2 | 1 (PRESENCE) |
| 2 | 0 | 2 | 1 | 1 (PRESENCE) |
| 3 | 1 | 1 | 0 | 1 (PRESENCE) |
| ... | 0 | 0 | 2 | ... |

FIG. 2C

31Aa CUSTOMIZED OBJECT FUNCTION TABLE

| MENU NUMBER (ITEM NUMBER) | FUNCTION NAME | CONTROL CHARACTERISTICS | SETTING NUMBER |
|---|---|---|---|
| 1 | AUTOMATIC DOOR LOCK | NONE | 0 |
| | | PARKING-INTERLOCKED | 1 |
| | | VEHICLE-SPEED-INTERLOCKED | 2 |
| 2 | PASSENGER COMPARTMENT LAMP ENERGIZATION TIME | 15 sec | 0 |
| | | 30 sec | 1 |
| | | 60 sec | 2 |
| 3 | AUTOMATIC DOOR UNLOCK | NONE | 0 |
| | | PARKING-INTERLOCKED | 1 |
| | | IGN. OFF-INTERLOCKED | 2 |
| ... | ... | ... | ... |

FIG. 3

31A SPECIFICATION-DEPENDENT FIRST FUNCTION INFORMATION TABLE

| MENU NUMBER (ITEM NUMBER) | SPECIFICATIONS ||||||||||||
|---|---|---|---|---|---|---|---|---|---|---|---|---|
| | VERSION I |||| VERSION II |||| VERSION III ||||
| | CONTROL CHARACTERISTIC VALUES ||| FUNCTION PRESENCE/ ABSENCE | CONTROL CHARACTERISTIC VALUES ||| FUNCTION PRESENCE/ ABSENCE | CONTROL CHARACTERISTIC VALUES ||| FUNCTION PRESENCE/ ABSENCE |
| | USER IDENTIFICATION CODE | | | | USER IDENTIFICATION CODE | | | | USER IDENTIFICATION CODE | | | |
| 1 | 0 | 1 | 2 | 1 (PRESENCE) | 0 | 1 | 2 | 1 (PRESENCE) | 0 | 1 | 2 | 0 (ABSENCE) |
| 2 | 0 | 2 | 1 | 1 (PRESENCE) | 0 | 2 | 1 | 0 (ABSENCE) | — | — | — | 1 (PRESENCE) |
| 3 | 1 | 1 | 0 | 1 (PRESENCE) | — | — | — | 1 (PRESENCE) | 1 | 2 | 0 | 0 (ABSENCE) |
| ⋮ | 0 | 0 | 2 | ⋮ | 0 | 1 | 2 | ⋮ | — | — | — | ⋮ |
| | ⋮ | ⋮ | ⋮ | | ⋮ | ⋮ | ⋮ | | ⋮ | ⋮ | ⋮ | |

FIG. 4

32 2ND FUNCTION INFORMATION TABLE

| CONTROL UNIT ADDRESS (CONTROL UNIT) | MENU NUMBER (ITEM NUMBER) | CUSTOMIZED OBJECT FUNCTION | | | FUNCTION PRESENCE/ ABSENCE | CONTROL CHARACTERISTIC VALUES | SCREEN DISPLAY RESULT |
|---|---|---|---|---|---|---|---|
| | | FUNCTION | DISPLAY CHARACTER CODE | | | | |
| | | | CONTROL CHARACTERISTICS | SETTING NUMBER | | | |
| 02 (18A) | 1 | AUTOMATIC DOOR LOCK | NONE | 0 | 1 (PRESENCE) | 2 | DISPLAY |
| | | | PARKING-INTERLOCKED | 1 | | | |
| | | | VEHICLE-SPEED-INTERLOCKED | 2 | | | |
| | 2 | PASSENGER COMPARTMENT LAMP ENERGIZATION TIME | 15 sec | 0 | 0 (ABSENCE) | — | NO DISPLAY |
| | | | 30 sec | 1 | | | |
| | | | 60 sec | 2 | | | |
| | 3 | AUTOMATIC DOOR UNLOCK | NONE | 0 | 1 (PRESENCE) | 1 | DISPLAY |
| | | | PARKING-INTERLOCKED | 1 | | | |
| | | | IGN. OFF-INTERLOCKED | 2 | | | |
| | ... | ... | ... | ... | ... | ... | ... |
| 03 (18B) | 1 | POWER WINDOW KEY-OFF TIMER | NONE | 0 | UNRECEIVED | — | NO DISPLAY |
| | | | 45 sec | 1 | | | |
| | | | 10 min | 2 | | | |
| 04 (18C) | 1 | FRONT WINDSHIELD WIPER OPERATION | VEHICLE-SPEED-INTERLOCKED | 0 | 1 (PRESENCE) | 0 | DISPLAY |
| | | | NOT VEHICLE-SPEED-INTERLOCKED | 1 | | | |
| | ... | ... | ... | ... | ... | ... | ... |
| 05 (18D) | 1 | MEMORY-SHEET-INTERLOCKED | INTERLOCKED | 0 | UNRECEIVED | — | NO DISPLAY |
| | | | NOT INTERLOCKED | 1 | | | |
| | ... | ... | ... | ... | ... | ... | ... |

32a ← → 32b ← → 32c

FIG. 5    80 FRAME FORMAT
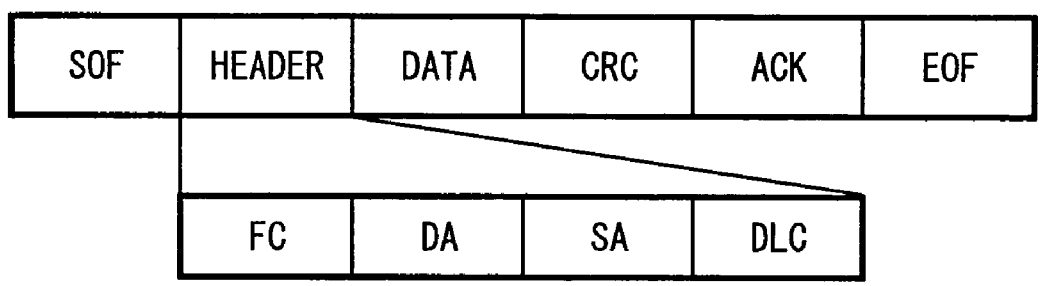

FIG. 6

TRANSMISSION PROCESS  98 (98RR, 98WR) CUSTOMIZATION SETTING REQUEST FRAME
100 (100RA, 100WA) CUSTOMIZATION SETTING RESPONSE FRAME

| TRANSMITTING CONDITIONS |
|---|
| WHEN ERADING/WRITING OF USER-CUSTOMIZABLE CHARACTERISTIC VALUES IS REQUESTED OR RESPONDED |

FRAME HEADER

| FC | DA | SA | DLC |
|---|---|---|---|
| EC | DESTINATION ADDRESS PA, OR BROADCAST ADDRESS "00" WHEN DEFAULT SETTINGS ARE INDICATED | OWN PA | 2 OR 3 |

DATA FIELD

| DATA ADDRESS (BYTE-BIT ADDRESS) | | CONTENTS |
|---|---|---|
| BYTE POSITION | BIT POSITION | |
| 1 | 7 | REQUEST/RESPONSE (0/1) |
| | 6 | READING/WRITING (0/1) |
| | 5 | ALL 0 |
| | 4 | |
| | 3 | |
| | 2 | |
| | 1 | |
| | 0 | |
| 2 | ALL | MENU NUMBER ("0" WHEN DEFAULT SETTINGS ARE INDICATED) |
| 3 | ALL | CONTROL CHARACTERISTIC VALUES |

FIG. 7

TRANSMISSION PROCESS — 102 USER IDENTIFICATION CODE FRAME

| TRANSMITTING CONDITIONS |
| --- |
| 1. TRANSMITTED WHEN SYSTEM IS WAKED UP |
| 2. TRANSMITTED WHEN USER IDENTIFICATION CODE IS CHANGED |
| 3. TRANSMITTED WHEN CUSTOMIZATION FUCNTION CHECK REQUESTFRAME IS RECEIVED |
| 4. TRANSMITTED PERIODICALLY AT PREETERMINED TIME INTERVALS |

FRAME HEADER

| FC | DA | SA | DLC |
| --- | --- | --- | --- |
| F8 | BROADCAST: 00 | USER IDENTICATION UNIT PA: 10 | 1 |

DATA FIELD

| DATA ADDRESS (BYTE-BIT ADDRESS) | | VALUES | CONTENTS |
| --- | --- | --- | --- |
| BYTE POSITION | BIT POSITION | | |
| 1 | 7 | 0 | DEFAULT |
| | 6 | 1 | IDENTIFICATION CODE |
| | 5 | 2 | IDENTIFICATION CODE |
| | 4~0 | ALL 0 | ALL 0 |

FIG. 8

| TRANSMISSION PROCESS | 94 CUSTOMIZATION FUNCTION CHECK REQUEST FRAME |
|---|---|
| | TRANSMITTING CONDITIONS |
| | WHEN CUSTOMIZATION FUNCTION INFORMATION OF CONTROL UNIT IS REQUESTED |

FRAME HEADER

| FC | DA | SA | DLC |
|---|---|---|---|
| EA | BROADCAST: 00 | DISPLAY UNIT PA: 01 | 2 |

DATA FIELD

| DATA ADDRESS (BYTE-BIT ADDRESS) || CONTENTS |
|---|---|---|
| BYTE POSITION | BIT POSITION | |
| 1 | ALL | REQUEST FRAME FC = EB |

FIG. 9

TRANSMISSION PROCESS — 96 CUSTOMIZATION FUNCTION CHECK RESPONSE FRAME

| TRANSMITTING CONDITIONS |
|---|
| WHEN RESPONDING TO REQUEST BY WAY OF CUSTOMIZATION FUNCTION REQUEST CHECK FRAME |

FRAME HEADER

| FC | DA | SA | DLC |
|---|---|---|---|
| EB | DISPLAY UNIT PA: 01 | OWN PA | 2~8 |

DATA FIELD

| DATA ADDRESS (BYTE-BIT ADDRESS) | | | CONTENTS |
|---|---|---|---|
| BYTE POSITION | BIT POSITION | MENU POSITION | CUSTOMIZED FUNCTION INFORMATION FUNCTION PRESENCE/ABSENCE |
| 1 | ALL | – | UNIT NUMBER PA (OWN PA) |
| 2 | 7 | 1 | 0 (WITHOUT FUNCTION)/ 1 (WITH FUNCTION) |
| | 6 | 2 | 0 (WITHOUT FUNCTION)/ 1 (WITH FUNCTION) |
| | 5 | 3 | 0 (WITHOUT FUNCTION)/ 1 (WITH FUNCTION) |
| | ... | | ... |
| | 0 | 8 | 0 (WITHOUT FUNCTION)/ 1 (WITH FUNCTION) |
| 3 | 7 | 9 | 0 (WITHOUT FUNCTION)/ 1 (WITH FUNCTION) |
| | 6 | 10 | 0 (WITHOUT FUNCTION)/ 1 (WITH FUNCTION) |
| | ... | ... | ... |
| ... | ... | ... | ... |
| 8 | ... | ... | ... |

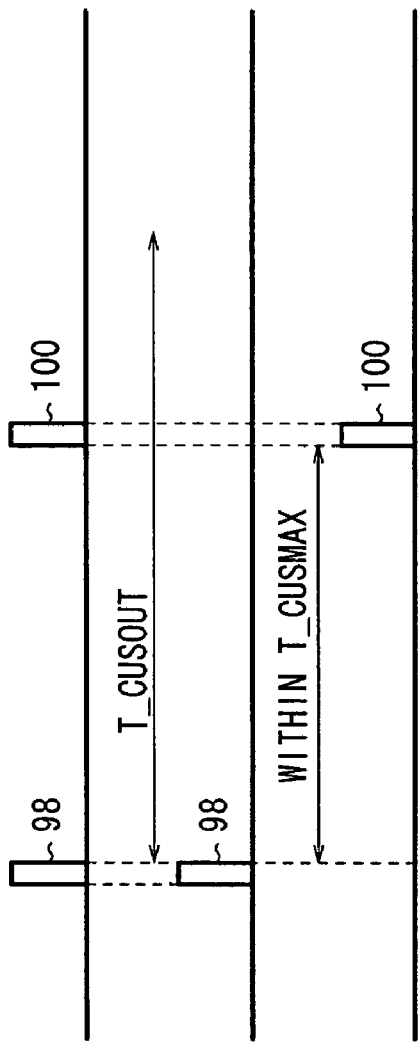

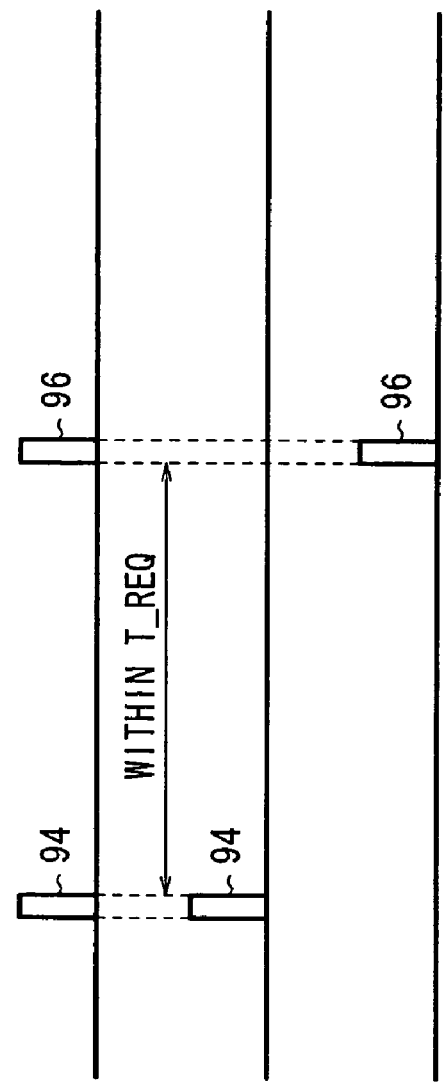

FIG. 13A  201

| MEMORY CUSTOMIZATION SETTING IMAGE |
|---|

FIG. 13B  202

| DRIVER 1 |
|---|
| → SETTING CHANGE |
| ALL DEFAULT |
| EXIT |

FIG. 13C  203

| DRIVER 1 |
|---|
| → AUTOMATIC DOOR LOCK |
| EXIT |

FIG. 13D  204

| DRIVER 1 |
|---|
| → AUTOMATIC DOOR UNLOCK |
| EXIT |

FIG. 13E  205

| AUTOMATIC DOOR LOCK |
|---|
| → OFF |
| PARKING-POSITION-INTERLOCKED |
| VEHICLE-SPEED-INTERLOCKED (15 km/h) |

FIG. 13F  206

| AUTOMATIC DOOR LOCK |
|---|
| OFF |
| → PARKING-POSITION-INTERLOCKED |
| VEHICLE-SPEED-INTERLOCKED (15 km/h) |

FIG. 13G  207

| AUOTMATIC DOOR LOCK |
|---|
| SETTINGS OK ? |

FIG. 13H  208

| AUTOMATIC DOOR LOCK |
|---|
| OFF |
| → PARKING-POSITION-INTERLOCKED |
| VEHICLE-SPEED-INTERLOCKED (15 km/h) |

FIG. 13I  209

| ALL DEFALT |
|---|
| SETTINGS OK ? |

FIG. 13J  210

| DRIVER 1 |
|---|
| SETTING CHANGE |
| → ALL DEFALT |
| EXIT |

FIG. 13K  211

| ALL DEFAULT |
|---|
| → ERROR |
| RETRY |

FIG. 13L  212

| AUTOMATIC DOOR LOCK |
|---|
| → ERROR |
| RETRY |

FIG. 13M  213

| CUSTOMAZATION IMPOSSIBLE |
|---|

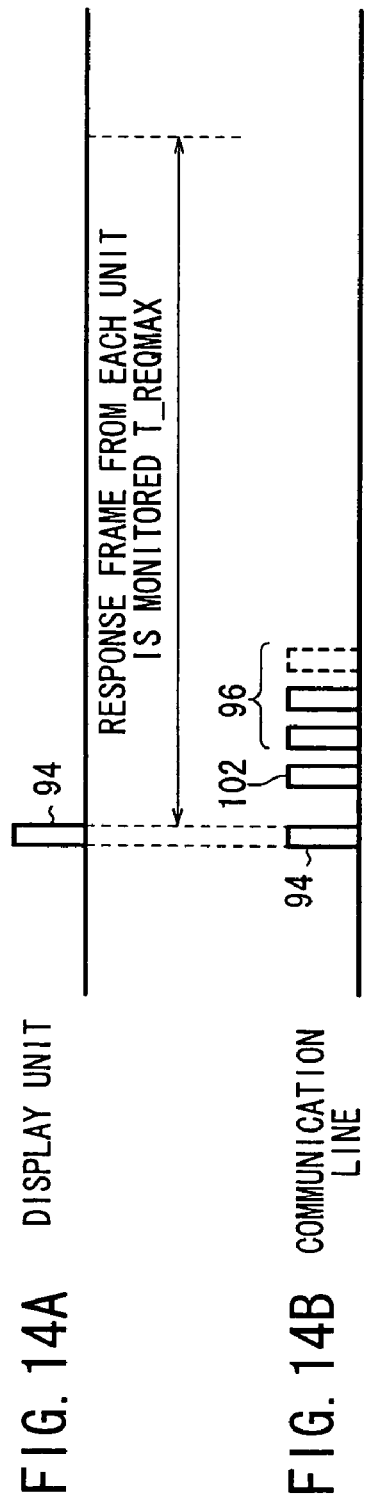

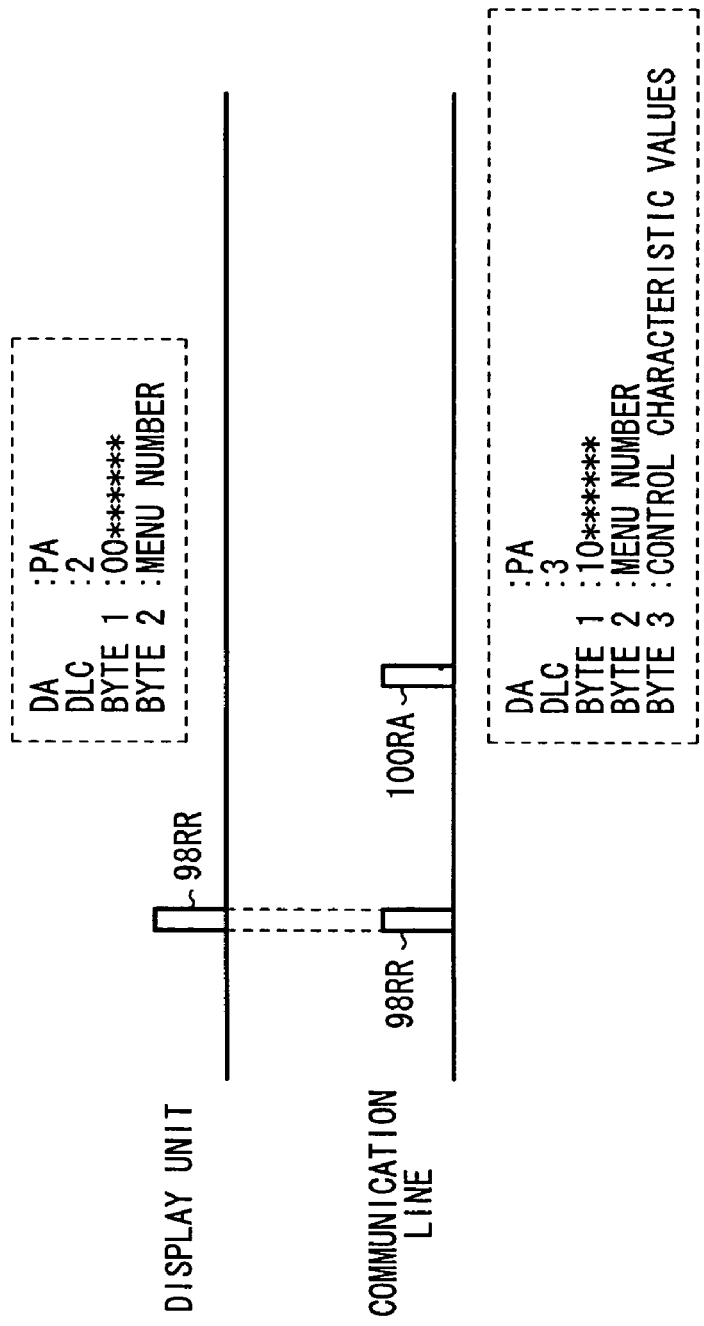

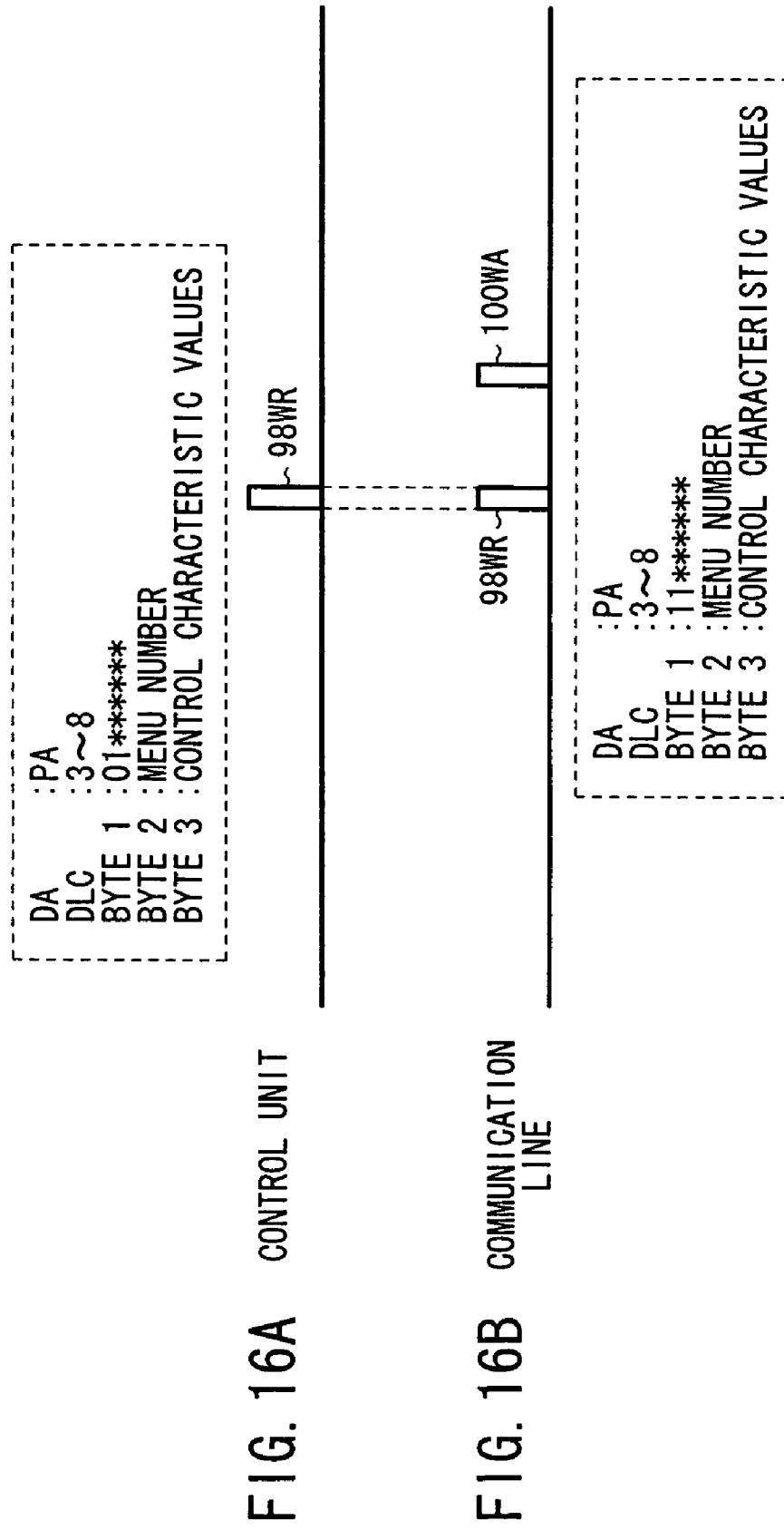

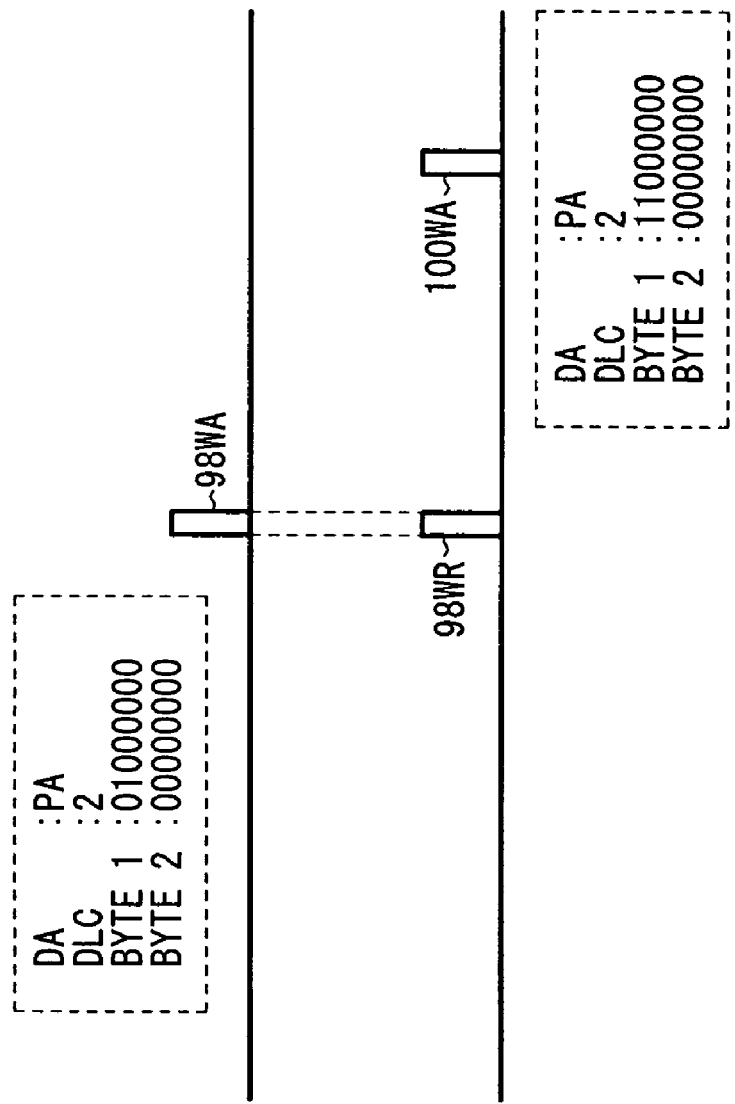
FIG. 17A  DISPLAY UNIT
FIG. 17B  COMMUNICATION LINE

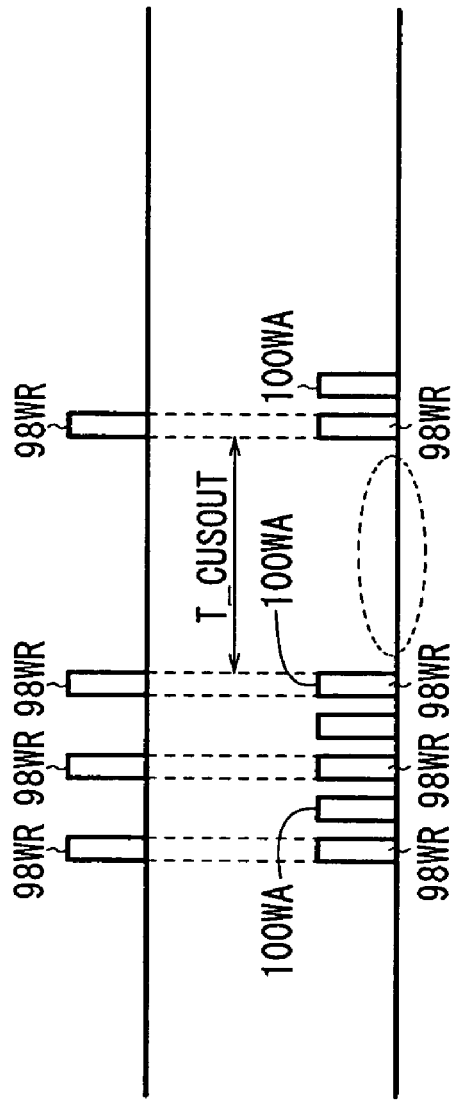
FIG. 18A DISPLAY UNIT
FIG. 18B COMMUNICATION LINE

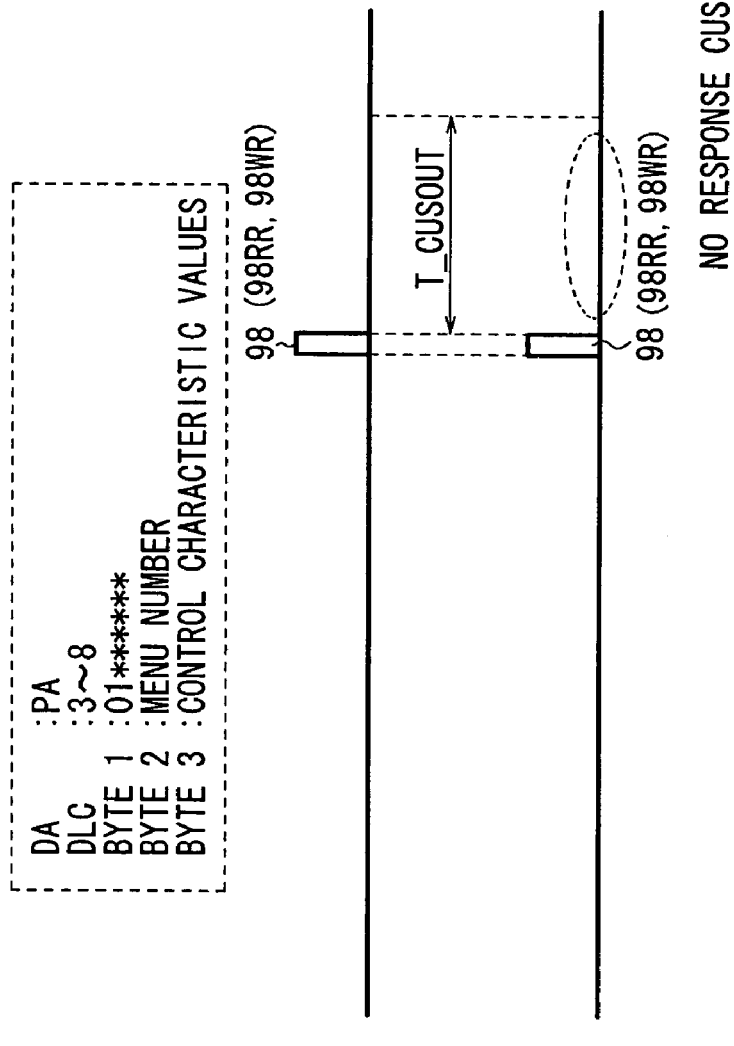
FIG. 19A DISPLAY UNIT
FIG. 19B COMMUNICATION LINE
NO RESPONSE CUSTOM FRAME

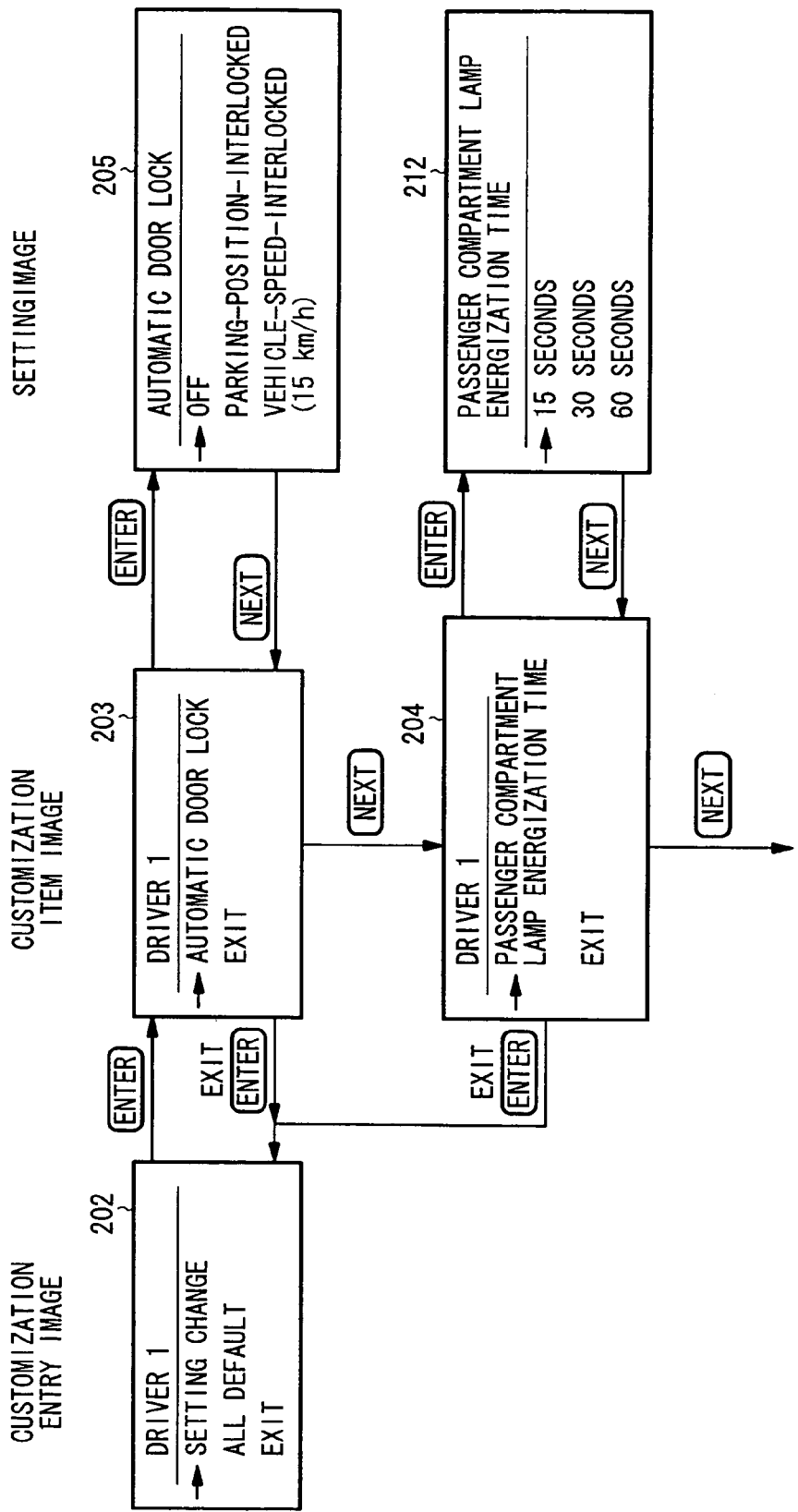

VEHICLE CUSTOMIZING SYSTEM

BACKGROUND OF THE INVENTION

1. Field of the Invention

The present invention relates to a vehicle customizing system having control units as vehicle-mounted controllers for performing vehicle functions, e.g., a function to energize a passenger compartment lamp for a predetermined period of time when a vehicle door is unlocked, based on control characteristic values such as a setting of 15 seconds, 30 seconds, or 0 seconds (not energized), and a display unit, such as a multi-display unit, connected to the control unit through a communication line and having an input means for changing such control characteristic values.

2. Description of the Related Art

In recent years, a wide variety of motor vehicle equipment improvements have been made in the art, and modern motor vehicles incorporate control units for performing various vehicle functions based on control characteristic values, e.g., functions for electric accessories such as power window systems, air-conditioning units, etc., as well as functions for basic vehicle components such as the engine, steering system, brake system, etc., for propelling, turning and stopping the motor vehicle.

According to conventional vehicle control systems, control characteristic values for certain functions performed by control units can be changed by the user to desired values through a display screen meter unit provided on the instrumental panel, or through a navigation system display screen (see Japanese Laid-Open Patent Publication No. 10-264739 and Japanese Laid-Open Patent Publication No. 2002-12099 for details).

Japanese Laid-Open Patent Publication No. 10-264739 discloses a technique for changing control characteristic value settings for a transmission computer, making up a control unit connected to a communication line, using a multi-display unit including a vehicle display monitor and a multi-display computer.

Japanese Laid-Open Patent Publication No. 2002-12099 discloses a customizing apparatus for customizing functions of electrical accessories, including the air-conditioning unit, audio system, power window mechanism, etc., which are controlled by respective control units, based on control characteristic values preferred by the user, through a meter unit making up a display unit mounted on a motor vehicle, and depending on signals transmitted from a transmitter.

However, according to the conventional arrangements disclosed in Japanese Laid-Open Patent Publication No. 10-264739 and Japanese Laid-Open Patent Publication No. 2002-12099, the control characteristic values for the control units are stored in a memory (DVD or nonvolatile memory) within the display unit. When the control units on the motor vehicle are activated, e.g., when the ignition switch is turned on, or when the ignition switch is turned on and the switches of the control units are also turned on, the control characteristic values are read from the memory of the display unit, and then set in the various memories (volatile memories such as registers or RAMs) of the control units through a communication line. Thereafter, the functions of the control units can first be performed.

Consequently, it takes a certain period of time after the switches have been turned on in order to activate the control units and until the functions of the control units can be performed.

Further, if a communication failure occurs due to a communication line disconnection or the like, then since the control units are unable to receive the control characteristic values sent from the display unit, the functions of the control units cannot be controlled. Japanese Laid-Open Patent Publication No. 10-264739 reveals a process for performing the function of a control unit, using substitute or default control characteristic values stored in a ROM of the control unit, in the event of a communication failure. However, such a system becomes costly overall due to the added cost of the ROM.

SUMMARY OF THE INVENTION

It is an object of the present invention to provide a vehicle customizing system which is capable of shortening the time period after the switches of control units have been turned on, i.e., after the control units have been activated, until functions of the control units can be performed.

Another object of the present invention is to provide a vehicle customizing system, which is capable of changing control characteristic value settings pertaining to the control units easily within a short time period.

Still another object of the present invention is to provide a vehicle customizing system, which is highly reliable in the event of communication failures.

The vehicle customizing system according to the present invention includes a control unit for performing a function thereof based on a control characteristic value, and a display unit having an input means connected to the control unit through a communication line, for changing the control characteristic value, the control unit having a first memory means for storing function information and a control characteristic value pertaining to the function, wherein the control unit performs the function based on the control characteristic value stored in the first memory means, and wherein the display unit displays the function information and the control characteristic value, which are received from the control unit through the communication line, and sends a modified control characteristic value changed by the input means to the control unit through the communication line, whereby the control unit stores the modified control characteristic value in the first memory means.

According to the above arrangement, the control unit and the display unit are connected to each other through the communication line, and when setting the control characteristic value pertaining to the function of the control unit to a value (control characteristic value) desired by the user, both the function and the current control characteristic value set for the function are displayed by the display unit, wherein the control characteristic value may be changed to the desired value using an input means of the display unit, and then the modified control characteristic value is stored in the first memory means of the control unit, which directly performs the function. Therefore, immediately, when the control unit is turned on, it can perform a function on its own, based on the control characteristic value desired by the user and stored in the first memory means thereof.

Even if communication between the display unit and the control unit fails, since the control unit always stores a control characteristic value in the first memory means thereof, the control unit can perform functions depending on the preference of the user. In addition, because it is not necessary to store any communication failure control values in a ROM, for use in the event of a communication failure, the vehicle customizing system is relatively inexpensive to manufacture.

The first memory means should preferably be an electrically rewritable nonvolatile memory, such as an EEPROM or the like, or a magnetically or optically rewritable disk, such as an HDD, a DVD, or the like, in which case, the rewritable disk may be considered a nonvolatile memory.

Throughout the specification, the term "customize" implies setting the control characteristic value pertaining to a given function to a desired value (control characteristic value) depending on the preference of the user.

Setting the control characteristic value of a function to a desired value (control characteristic value) depending on the preference of the user may involve setting a function to turn on a passenger compartment lamp for a predetermined time after the vehicle doors have been unlocked by a transmitter from outside of the vehicle, based on control characteristic values of 15 seconds, 30 seconds, or 0 seconds (not energized), for example. Setting a control characteristic value may also imply selection of a control characteristic value to perform or inhibit a given function. For example, a control characteristic value may be selected to perform or inhibit the function of a keyless answerback process, for indicating to the user that the vehicle doors have been locked or unlocked by a keyless entry system, by means of blinking of the passenger compartment lamp. Furthermore, as disclosed in Japanese Laid-Open Patent Publication No. 10-264739, a control characteristic value may be selected to perform a control process for automatically changing the control characteristic value of a certain function, in order to perform the control process and to fix control characteristics. For example, in connection with detecting that the vehicle is running on a gradient, a control characteristic value may be selected to perform or inhibit an automatic slope running control process for automatically changing a speed reduction ratio map for an automatic transmission, in order to make the vehicle best suited to run on sloping roads. The term "customization" or "user customization" shall be used in the following descriptions to mean setting the control characteristic value of a function to a desired value (control characteristic value) depending on the preference of the user.

According to the present invention, the vehicle customizing system further includes a plurality of control units connectable to a communication line, wherein the control units have different inherent functions depending on specifications thereof, and wherein the display unit includes a second memory means for storing an information table containing information of all the functions of the control units which are connectable to the communication line, and wherein an image to be displayed is determined based on the table and the function information which is received through the communication line from the control units connected to the communication line.

In the above arrangement, the display unit stores an information table (tabular data) containing information concerning all the functions of the control units which are connected to the communication line, and which differ depending on the specifications thereof, wherein an image (customization item image) to be displayed is determined based on the table and the received function information. Therefore, the display unit can recognize a connected state, indicative of which control units are connected by the communication line, based on the table and the received function information, and an image to be displayed can be determined depending on the connected state. The display unit is therefore able to automatically recognize different control units, installed on vehicles of different types or grades, and generate an image to be displayed, which matches the recognized control units.

Consequently, it is unnecessary to manufacture different types of display units depending on vehicles of different types or grades, and the display unit can easily be managed as a product, making the vehicle less expensive to manufacture.

Even when optional parts are added to the vehicle, the vehicle customizing system can easily and inexpensively be expanded, simply by adding a new control unit to the communication line.

The second memory means preferably should be a nonvolatile memory, similar to the first memory means.

According to the present invention, the vehicle customizing system further includes a user identification unit connected to the communication line, including a user identification code memory means for storing user identification information for identifying the user, wherein the control unit stores a control characteristic value depending on the user identification information in the first memory means, and sends the control characteristic value depending on the user identification information and stored in the first memory means to the display unit.

With the above arrangement, the first memory means of the control unit stores a control characteristic value for each user (driver) depending on the user's identification information, with respect to functions of the control unit. Consequently, different users of the vehicle can set functions of the control unit to desired values depending on user preferences. Since it is not necessary to change the control characteristic value each time the user of the vehicle is changed, the vehicle customizing system can easily be used and provides better product appeal.

Furthermore, since the user's identification information received by the display unit is displayed, the user can confirm which control characteristic values are set for each function, and the user is prevented from erroneously changing the control characteristic values of another user.

Further, according to the present invention, the control unit sends control characteristic values to the display unit only after the user identification information has been stored in the first memory means.

With the above arrangement, since the control characteristic values cannot be received by the display unit unless user identification information indicating that the vehicle is being used by a legitimate user has been stored, control characteristic values cannot be changed if the user identification information is not stored in the first memory means. Therefore, control characteristics for functions of the control unit cannot freely be changed by persons other than the legitimate user, thus increasing safety and reliability.

According to the present invention, when the display unit is brought into a state capable of changing a control characteristic value stored in the first memory means of the control unit, the display unit sends a function information request signal, which requests the control unit to send function information concerning the function of the control unit through the communication line. The display unit recognizes the control unit connected to the communication line along with the function of the control unit, and determines an image to be displayed based on a function information response signal, including the function information received from the control unit within a predetermined time after the function information request signal has been sent.

With the above arrangement, the display unit sends a function information request signal, for requesting the control unit to send a function information response signal including function information concerning the function of the control unit through the communication line, which also includes a condition that the function information response signal be received within a predetermined time after the function information request signal has been sent. If a function information response signal is not received within the predetermined time, then it is possible to detect a communication failure.

Therefore, in the event of a communication failure, an error can be displayed. This feature also enhances product appeal of the vehicle customizing system. If the function of the control unit connected to the communication line is not displayed, then the user can recognize that the communication circuit of the control unit is inoperative and can take necessary actions to remedy the failure.

According to the present invention, functions displayed on a display screen of the display unit may be selected by an input means, wherein the display unit sends a control characteristic value request signal for requesting the control unit, having the selected function, to send a control characteristic value pertaining to the function. The display unit displays the control characteristic value returned from the control unit having the selected function, and when the control characteristic value is changed by the input means, the display unit sends the changed control characteristic value through the communication line so that the first memory means stores the changed control characteristic value.

In the above arrangement, when the display unit is brought into a state capable of changing the control characteristic value stored in the first memory means of the control unit, the function information of the control unit and the control characteristic value corresponding to the function are not transmitted together, but rather, the function information of the control unit is sent and received depending on the function information request signal. Then, the control characteristic value pertaining only to the function selected depending on the function information request signal is sent and received. Consequently, the amount of data sent over the communication line is optimized, thus reducing the communication load along the communication line. Stated otherwise, fluctuations in communication traffic along the communication line are small, and thus even if the number of connected control units increases, there is no need to use a high-speed communication circuit and the vehicle customizing system can be manufactured inexpensively.

According to the present invention, the vehicle customizing system further includes a user identification unit connected to the communication line, for storing user identification information for identifying the user, wherein the user identification unit sends the user identification information through the communication line and the control unit stores the user identification information in the first memory means. When the control unit receives the control characteristic value request signal from the display unit through the communication line, the control unit sends the control characteristic value to the display unit, in accordance with the user identification information stored in the first memory means.

In the above arrangement, the first memory means of the control unit stores a control characteristic value depending on user identification information for each user, with respect to the function of the control unit. Consequently, different users of the vehicle can set the function of the control unit to a desired value, depending on the preference of the user. Since the control characteristic value does not need to be changed each time the user of the vehicle is changed, the vehicle customizing system can easily be used and provides better product appeal. Furthermore, since the user's identification information is received by the display unit and displayed, the user can confirm the control characteristic value that the user has set for the function, and is prevented from erroneously changing the control characteristic value of another user.

According to the present invention, the first memory means of the control unit stores a default control characteristic value, which is preset as a factory setting for the function of the control unit. Therefore, the present control characteristic value may be changed to the default control characteristic value, and the default control characteristic value may be stored, when a default setting instruction is received from the display unit through the communication line.

With the above arrangement, the control unit stores a default control characteristic value, and the present control characteristic value is changed to the default control characteristic value in accordance with a default setting instruction. Consequently, when the user sells the vehicle to a vehicle dealer, control characteristic values can easily be set back to their default control characteristic values that are described in the vehicle catalog, i.e., the default control characteristic values that are effective when the vehicle is purchased.

According to the present invention, the control characteristic value for the function of the control unit can easily be changed using the display unit.

Furthermore, the operations of the display unit and the control unit are appropriately distributed, such that when the control unit is activated, the control unit can immediately control the function using the control characteristic value that has been stored therein and set to a value favored by the user. Therefore, the time consumed after the control unit has been activated (i.e., turned on) until the control unit performs the desired function may be shortened. Stated otherwise, the time required to set function settings to the settings favored by the user may be reduced, thus providing improved response.

Furthermore, since the control unit itself stores the control characteristic value, the vehicle customizing system operates highly reliably, even in the event of a communication failure between the control unit and the display unit.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2A is a diagram showing an example of specific information contained in a first function information table in a memory of a control unit;

FIG. 2B is a diagram showing an example of specific information contained in a first function information table stored, as a minimum unit, in the first function information table;

FIG. 2C is a diagram showing an example of specific information contained in a customized object function table in the first function information table;

FIG. 3 is a diagram showing an example of specific information contained in a specification-dependent first function information table in a memory of a control unit;

FIG. 4 is a diagram showing an example of specific information contained in a second function information table in a memory of a display unit;

FIG. 5 is a diagram showing the frame format of a communication frame;

FIG. 6 is a diagram showing customization setting request and response frames;

FIG. 7 is a diagram showing a user identification code frame;

FIG. 8 is a diagram showing a customization function check request frame;

FIG. 9 is a diagram showing a customization function check response frame;

FIGS. 10A through 10C are timing charts showing an operation sequence of the customization setting request and response frames;

FIGS. 11A through 11C are timing charts showing an operation sequence of the customization function check request frame and the customization function check response frame;

FIG. 13A is a view showing a customization setting image;

FIG. 13B is a view showing a customization entry image;

FIG. 13C is a view showing a customization item image;

FIG. 13D is a view showing a customization item image;

FIG. 13E is a view showing a display image used for changing control characteristic value settings;

FIG. 13F is a view showing a display image used for changing a parking-position-interlock setting;

FIG. 13G is a view showing a setting confirmation image;

FIG. 13H is a view showing a display image used for changing a parking-position-interlock setting;

FIG. 13I is a view showing an image for confirming whether default settings are to be executed or not;

FIG. 13J is a view showing a customization entry image with all default settings selected;

FIG. 13K is a view showing an image for determining whether an error message shall be displayed or whether a retry attempt shall be performed;

FIG. 13L is a view showing an image for determining whether an error message shall be displayed or whether a retry attempt shall be performed;

FIG. 13M is a view showing an error display image;

FIGS. 14A and 14B are timing charts for an initialization process;

FIGS. 15A and 15B are a timing charts for a frame sending and receiving process, for confirming present control characteristic values of a control unit;

FIGS. 16A and 16B are a timing charts for a frame sending and receiving process, for changing the settings of control characteristic values of a control unit;

FIGS. 17A and 17B are timing charts for a frame sending and receiving process, for changing default settings;

FIGS. 18A and 18B are timing charts of another frame sending and receiving process, for changing default settings;

FIGS. 19A and 19B are timing charts of an error displaying process; and

FIG. 20 is a diagram showing a hierarchical relationship between control switch operations and displayed images.

DESCRIPTION OF THE PRFERRED EMBODIMENTS

Figure 1:
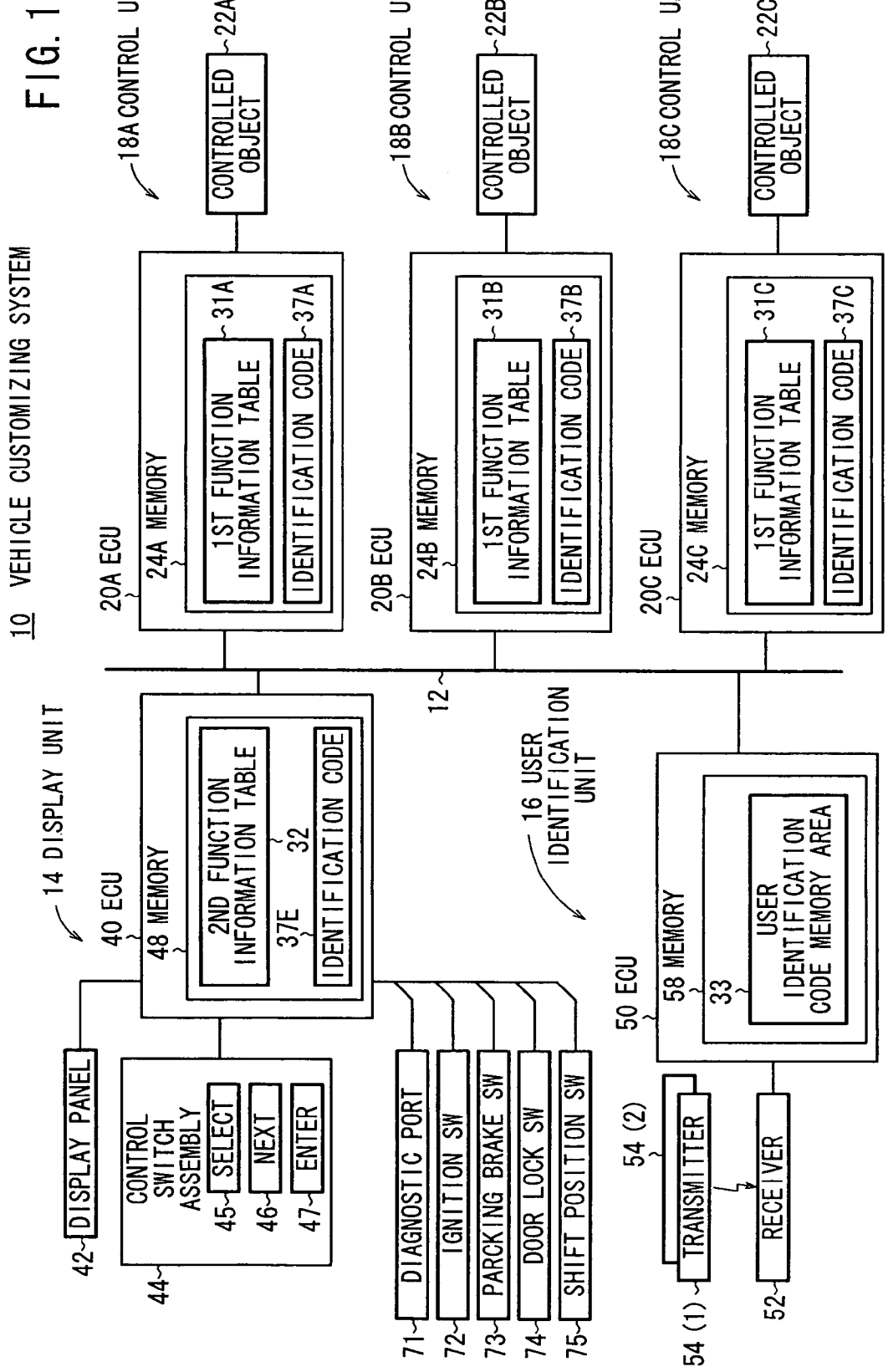
FIG. 1 is a block diagram of a vehicle customizing system according to an embodiment of the present invention.

FIG. 1 shows in block form a vehicle customizing system 10 according to an embodiment of the present invention, which is to be mounted on a motor vehicle.

As shown in FIG. 1, the vehicle customizing system 10 is a network system, which basically comprises a display unit 14, a user identification unit 16, and a plurality of control units 18A through 18C (also collectively denoted by 18) that are connected to each other by a communication line 12. A minimum makeup of the vehicle customizing system 10 includes the communication line 12, the display unit 14, and a single control unit 18 connected to the communication line 12. The display unit 14 is used to customize functions of the control units 18A through 18C, which are connected to the communication line 12.

Customizing functions of the control units 18A through 18C implies changing the settings (control characteristic values) of functions that are performed by the control units 18 connected to the communication line 12, wherein a control switch assembly 44 is operated by a legitimate user, who may be the driver of the motor vehicle and carries a key for the motor vehicle or a keyless transmitter 54 (1) or 54 (2) (collectively denoted by 54), while viewing a customization menu and other images, which are displayed on a display panel 42 of the display unit 14 and controlled via the control switch assembly 44.

The control units 18 each contain respective ECUs 20A through 20C (collectively denoted by 20) connected to the communication line 12, and respective controlled objects 22A through 22C (collectively denoted by 22) that are controlled by the ECUs 20. The controlled objects 22A through 22C may be electric accessories, including a door lock, a passenger compartment lamp, a front windshield wiper, a power window system, etc., as well as basic vehicle components including the engine, the transmission, etc.

The display unit 14 includes an ECU 40 that is connected to the communication line 12, a display panel 42 such as a liquid crystal display panel or the like connected to the ECU 40, and a control switch assembly 44 serving as an input means. A diagnostic port 71, an ignition switch 72, a parking brake switch 73, a door lock switch 74, a shift position switch 75, and a vehicle speed sensor (not shown) are connected to the ECU 40.

The control switch assembly 44 includes a SELECT button 45 for selecting items in the displayed images, a NEXT button 46 for going to a next image or returning to a preceding image, and an ENTER button 47 for entering a selected item. The buttons 45, 46 and 47 comprise button switches that can also be used to enter customization settings. The control switch assembly 44 may be integrally incorporated as a touch panel within the display panel 42, or may be connected as a separate control switch unit to the display unit 14, via the communication line 12.

The user identification unit 16 comprises an ECU 50 connected to the communication line 12, a receiver 52 connected to the ECU 50 for receiving radio waves, and a transmitter 54 for sending radio waves to the receiver 52 which contain data representative of a user identification code.

The ECUs 20A through 20C of the control units 18A through 18C have respective memories 24A through 24C (collectively denoted by 24) serving as the first memory means. The memories 24A through 24C include respective first function information tables 31A through 31C (collectively denoted by 31), and respective user identification code memory areas 37A through 37C (collectively denoted by 37) making up the user identification code memory means. As described later on, the user identification code memory areas 37 store a user identification code "0" as a factory default setting.

For easier understanding of the present invention, the control unit 18A shall be described as a door lock control unit, the control unit 18B as a power window control unit, and the control unit 18C as a front windshield wiper control unit.

The ECU 40 of the display unit 14 includes a memory 48 serving as the second memory means. The memory 48 also incorporates a second function information table 32 and a user identification code memory area 37E serving as a user identification code memory means. The ECU 50 of the user identification unit 16 also includes a memory 58 having a user identification code memory area 33 serving as a user identification code memory means.

Each of the ECUs 20, 40 and 50 comprises a microcomputer having a CPU, a ROM, a RAM, a timer, and input/ output interfaces such as an A/D converter, a D/A converter, etc., and further having processing, controlling and evaluating functions therein.

Each of the memories 24, 48 and 58 comprises a rewritable nonvolatile ROM such as an EEPROM or the like. In actual practice, a flash memory is employed for each of the memories 24, 48, 58.

FIG. 2A shows an example of specific information contained in the first function information table 31A, within the memory 24A of the control unit 18A, to provide a specific example of the first function information tables 31.

FIG. 2B shows an example of specific information contained in a first function information table 31Am, which makes up a minimum unit in the first function information table 31A. Further, FIG. 2C shows an example of specific information contained in a customized object function table 31Aa within the first function information table 31A.

FIG. 3 shows an example of specific information contained in a specification-dependent first function information table 31As, employing the first function information table 31Am as a minimum unit thereof.

The first function information table 31A shown in FIG. 2A is made up of the customized object function table (data area) 31Aa shown in FIG. 2C, a control characteristic value data area 31Ab, and a function presence/absence data area 31Ac.

The customized object function table 31Aa forms a data area that indicates customizable functions of the control unit 18A, as well as control characteristics that can be set for the customizable functions. Such a data area comprises a menu table including functions such as "AUTOMATIC LOCK", etc., together with menu numbers (item numbers) representing such functions, and a control characteristics table containing control characteristics that the user can set for the functions and setting numbers representative of the control characteristics. The door lock control units are typically manufactured to different specifications and possess different functions depending on the types, grades and intended destinations of motor vehicles on which they are to be mounted. The customized object function table 31Aa contains data that are common to all specifications of the door lock control units.

The control characteristic value data area 31Ab is a data area for indicating control characteristic values, which are set depending on user identification codes for certain functions or menu numbers. The control characteristic values for the user identification code "0" are default control characteristic values. Such default control characteristic values are control characteristic values which are preset upon factory shipment. If the user cannot be identified when the motor vehicle is used, e.g., if the ignition key is inserted into a door key cylinder to unlock the vehicle doors without using the transmitter 54, then the control unit 18A performs functions, and in particular controls the controlled object 22A, based on the default control characteristic values.

The function presence/absence data area 31Ac is a data area indicating whether the control unit 18A has functions indicated by certain menu numbers or not, in accordance with present specifications. The function presence/absence data, which are contained in the function presence/absence data area 31Ac, are preset depending on the specifications of the control unit 18A, as shown in FIG. 3. According to the present embodiment, the function presence/absence data for the respective menu numbers correspond to "function information" which, as described in greater detail later, is generated by allocating the function presence/absence data to a given data area, in order to indicate menu numbers prescribed by data byte-bit addresses in a customization function check response frame 96, as shown in FIG. 9.

Even identical control units have different functions depending on the types, grades and intended destinations of motor vehicles. In the present embodiment, there are three specification categories, represented as versions I, II and III. The specification-dependent first function information table 31As, shown in FIG. 3, has different values that are provided in the function presence/absence data areas, depending on such versions I, II and III. Naturally, control characteristic values (i.e., setting numbers thereof) are not set for functions that are not available on the motor vehicle.

The user identification code memory area 37A is an area for storing a user identification code, to be described later in more detail, which is received from the user identification unit 16 via the communication line 12. Based on the user identification code stored in the user identification code memory area 37A, the control unit 18A performs functions based on control characteristic values that correspond to the user identification code.

In any one of the four situations described below, the user identification unit 16 sends a user identification code stored in the user identification code memory area 33 to the communication line 12. In the first situation, the user identification unit 16 sends a user identification code when it has received a transmitter identification signal from the transmitter 54 via the receiver 52. In the second situation, the user identification unit 16 sends a user identification code when it has received a customization function check request frame 94 (described later on), which serves as a function information request signal. In the third situation, the user identification unit 16 sends a user identification code when it wakes up. In the fourth situation, the user identification unit 16 periodically sends a user identification code at predetermined time intervals after it has been wakened.

Each time the user identification unit 16 receives a transmitter identification signal from the transmitter 54, the user identification unit 16 updates and stores a user identification code "1" or "2" corresponding to the transmitter identification signal in the user identification code memory area 33, and then sends the updated user identification code to the communication line 12. When the user cannot be identified, e.g., when the user inserts the ignition key into a door key cylinder to unlock the vehicle doors, waking up the user identification unit 16, then the user identification unit 16 updates and stores a user identification code "0" representing that the user cannot be identified in the user identification code memory area 33, and then sends the updated user identification code to the communication line 12.

When the user identification unit 16 has received a customization function check request frame 94, or when the user identification unit 16 periodically sends a user identification code, the user identification unit 16 sends the user identification code that is stored in the user identification code memory area 33.

The term "user identification information" corresponds to the user identification code "1" or "2" indicating that the user has been identified. By contrast, the user identification code "0" indicating that the user has not been identified is not signified by the term "user identification information".

FIG. 4 shows an example of specific information contained in the second function information table 32 in the memory 48 of the display unit 14.

The second function information table 32 stores menu numbers indicative of all function information for the functions of all the control units 18A through 18C (18D . . . ) that can be connected to the communication line 12, in association with the individual control units 18A through 18C, i.e., in association with control unit addresses (physical addresses PA="02" through "05" assigned respectively to the control units 18A through 18D in FIG. 4), and also stores corresponding display character codes. The display character codes represent information for determining functions (function names) based on the menu numbers, as function information received via the communication line 12, and control characteristics (control characteristic names) based on control characteristic values, and for displaying characters (including pictographic characters) on the screen of the display panel 42. The second function information table 32 is typically stored in the memory 48 of the display unit 14 before the motor vehicle is shipped from the factory.

The second function information table 32 comprises a customized object function table 32a, a reception data area 32b, and an image display result area 32c.

The customized object function table 32a is a table that holds information concerning all the functions that the individual control units can have, with respect to the control units that can be connected. This table is made up of tabular data.

The reception data area 32b stores data received from the control units 18, i.e., function information (function presence/absence data) and control characteristic values. In the reception data area 32b, "UNRECEIVED" indicates that no function information has been received within a given period of time for some reason. The control unit 18D is an optional control unit, which can be connected to the communication line 12. Since the control unit 18D is not connected to the communication line 12 in the embodiment shown in FIG. 1, "UNRECEIVED" with respect to the control unit 18D indicates that no function information has been received therefrom within a given period of time. The information contained in the reception data area 32b for the control unit 18A pertains to version II and user identification code "1" (see FIG. 3).

The image display result area 32c indicates a decision result as to whether a display character code is to be displayed on the display panel 42 or not, based on the customized object function table 32a and the function information.

Control characteristics of a customizable automatic door locking function of the control unit 18A, serving as a door lock control unit, will be described below. Selectable or customizable control characteristics of the automatic door lock function, corresponding to menu number "1" as function information for the control unit 18A, are stored, wherein NONE (no automatic door lock control is performed)" corresponds to a setting number "0", PARKING-INTERLOCKED (automatic door lock control is performed when the shift position switch 75 is shifted from a parking position to a drive position corresponding to a running position) corresponds to a setting number "1", and SPEED-INTERLOCKED (automatic door lock control is performed when the vehicle speed becomes equal to or higher than a certain speed, e.g., 15 km/h) corresponds to a setting number "2".

Control characteristics for a passenger compartment lamp energization time function of the control unit 18A, serving as a door lock control unit, will be described below. Function information items for the control unit 18A corresponding to a menu number "2" are similarly stored, wherein 15 SECONDS (a passenger compartment lamp is energized for 15 seconds after the vehicle doors are unlocked) corresponds to a setting number "0", 30 SECONDS (a passenger compartment lamp is energized for 30 seconds after the vehicle doors are unlocked) corresponds to a setting number "1", and 60 SECONDS (a passenger compartment lamp is energized for 60 seconds after the vehicle doors are unlocked) corresponds to a setting number "2".

Control characteristics of an automatic door unlocking function of the control unit 18A, serving as a door lock control unit, will be described below. Function information items for the control unit 18A corresponding to a menu number "2" are similarly stored, wherein NONE (no automatic door unlock control is performed)" corresponds to a setting number "0", PARKING-INTERLOCKED (automatic door unlock control is performed when the shift position switch 75 is shifted from a parking position to a drive position corresponding to a running position) corresponds to a setting number "1", and IGNITION-SWITCH-OFF-INTERLOCKED (automatic door unlock control is performed when the ignition switch 72 is turned off) corresponds to a setting number "2".

A power window key-off timer function is stored in association with a menu number "1" for the control unit 18B, serving as a power window control unit. Control characteristics of the power window key-off timer function operate so as to set times in which the power window system is allowed to operate after the ignition switch 72 has been turned off. As shown in FIG. 4, function information items for the control unit 18B are stored, wherein NONE (there is no time in which the power window system is allowed to operate after the ignition switch 72 is turned off) corresponds to a setting number "0", 45 SECONDS (there are 45 seconds in which the power window system is allowed to operate after the ignition switch 72 is turned off) corresponds to a setting number "1", and 10 MINUTES (there are 10 minutes in which the power window system is allowed to operate after the ignition switch 72 is turned off) corresponds to a setting number "0".

For the control unit 18C, which serves as a front windshield wiper control unit, a speed-interlocked wiper operating function is stored in association with a menu number "1". Control characteristics of the speed-interlocked wiper operating function operate to increase the number of reciprocating cycles per unit time of a front windshield wiper as the vehicle speed increases.

Control unit 18D serves as a memory seat control unit, which is not connected to the communication line 12 shown in FIG. 1, and has a seat interlocking function that is stored in association with a menu number "1". Selectable or customizable control characteristics of the seat interlocking function are stored, wherein INTERLOCK (the driver's seat is automatically moved to a predetermined position in interlocked relation to the reception of a door unlocking signal from the transmitter 54, depending on the transmitter identification signal that is included in the door unlocking signal) corresponds to a setting number "0", and NONINTERLOCK (the driver's seat is not moved in interlocked relation to the reception of a door unlocking signal from the transmitter 54) corresponds to a setting number "1".

In the vehicle customizing system 10, which comprises a network system as shown in FIG. 1, the control units 18 are controlled when communication frames (frames), having the predetermined frame format 80 shown in FIG. 5, are sent and received between the display unit 14, the user identification unit 16 and the control unit 18, through the communication line 12.

The frame format 80 comprises a start-of-frame field SOF, a header field HEADER, a data field DATA, a frame check field CRC, an acknowledgement field ACK, and an end-of-frame field EOF.

The header field HEADER comprises an 8-bit message frame code FC, an 8-bit destination address DA, an 8-bit source address SA, and a 4-bit data length code (DLC) representing the data length of the data field. The message frame code FC is a code identifying the content of the communication frame. Specifically, the message frame code FC is a code indicating whether the communication frame is a customization setting request frame 98, a customization setting response frame 100, a user identification code frame 102, a customization function check request frame 94, or a customization function check response frame 96 (to be described later on).

In the present embodiment, as shown in FIG. 4, destination and source addresses DA, SA are established, such that the control unit 18A has an address "02", the control unit 18B has an address "03", the control unit 18C has an address "04", and the control unit 18D has an address "05". The display unit 14 has an address "01" and the user identification unit 16 has an address "10". These addresses are stored in the ROM areas of memories 24A through 24D, as well as memories 48 and 58.

In FIG. 1, the display panel 42 and the control switch assembly 44 serve as a human interface, which is used by the user to register or change the settings of functions that can be customized by the user. As described above, the display panel 42 and the control switch assembly 44 may be constructed integrally with or separate from the mounting board of the ECU 40, or may be connected to the ECU 40 through the communication line 12.

The ECU 40 has a function to monitor state changes (transitions) and states (ON or OFF states or switch positions), which are selected by the user, with respect to the control switch assembly 44, the diagnostic port 71, the ignition switch 72, the parking brake switch 73, the door lock switch 74, and the shift position switch 75. The ECU 40 also functions to change displayed images on the display panel 42, depending on the state changes and states of such switches.

The ECU 50 is connected to the receiver 52, which receives radio waves from the transmitter 54 that stores an identification signal. The ECU 50 has a function to check the identification signal output from the receiver 52 against two identification signals stored in the ECU 50, and to store a user identification code corresponding to the matching identification signal in the user identification code memory area 33, and send the user identification code stored in the user identification code memory area 33, which is carried in the data field of the frame format 80, to the communication line 12.

The identification signal output from the receiver 52 is an identification signal that is registered in advance in the transmitter 54. Different users who are expected to drive the motor vehicle, e.g., a father (transmitter 54(1) carried by the father) and a mother (transmitter 54(2) carried by the mother), are provided with respective different identification signals. In the present embodiment, user identification codes corresponding to such different identification signals are set to "1" and "2", respectively.

The identification signal output from the receiver 52 is transmitted to the receiver 52 when the user carrying the transmitter 54 unlocks or unlocks the vehicle doors from outside the motor vehicle in order to board the vehicle. For example, when the vehicle doors are unlocked from outside the motor vehicle by the transmitter 54 so that the user can board and drive the motor vehicle, the ECU 50 stores the user identification code, corresponding to the identification signal stored in the transmitter 54, in the user identification code memory area 33.

The display unit 14 may include a meter unit or a navigation unit for the motor vehicle. The transmitter 54 is an electric component that is carried and used by the user to unlock or unlock the vehicle doors for boarding the motor vehicle. The transmitter 54 is known as a keyless transmitter.

While the motor vehicle is parked (i.e., the ignition switch 72 is turned off, the parking brake switch 73 is turned on, and the door lock switch 74 is turned on, thereby locking the doors), when the user operates the transmitter 54 from outside the vehicle, which stores therein a certain identification signal within its own ROM, and the transmitter 54 sends radio waves containing the identification signal, the user identification unit 16 is wakened (activated) through the receiver 52, and the display unit 14 and control units 18 also are wakened (activated) through the communication line 12. At this time, a user identification code corresponding to the received identification signal is stored in the user identification code memory area 33 of the user identification unit 16, and the stored user identification code is transmitted through the communication line 12 to the control units 18A through 18C and the display unit 14 and stored in the user identification code memory areas 37A through 37C and 37E. When the transmitter 54 is not operated, but the ignition key is inserted into a door key cylinder to unlock the vehicle doors, the default user identification code "0" is stored in the user identification code memory area 33, and the stored user identification code is transmitted through the communication line 12 to the control units 18A through 18C and the display unit 14. The user identification code from the ECU 40 of the display unit 14 is then stored in the user identification code memory areas 37A through 37C and 37E.

When the motor vehicle is operating in a normal mode when the motor vehicle is running, that is, when the motor vehicle is not in a customizing mode for enabling settings of control characteristic values to be changed, the control units 18 perform their inherent functions based on the control characteristic values (setting numbers) that are stored therein, in association with the respective user identification codes, in the control characteristic value data area 31Ab of the first function information table 31A, and depending on the user identification code "0", "1" or "2" stored in the user identification code memory areas 37A through 37C.

Various types of communication frames, which are sent and received according to the frame format 80 between the display unit 14, the user identification unit 16 and the control units 18A through 18C, through the communication line 12, shall be described below.

FIG. 6 shows a customization setting request frame 98 (98RP, 98WR), serving as a control characteristic value request signal, and a customization setting response frame 100 (100RA, 100WA), serving as a control characteristic value response signal, which are used to modify customization settings in the customizing mode. A transmission process is performed to send these frames when there is a request to read or write control characteristic values as user-customizable settings, or in response to such a request. Specifically, a customization setting request frame 98RR, forming a reading request sent from the display unit 14, a customization setting request frame 98WR, forming a writing request sent from the display unit 14, a customization setting response frame 100RA, forming a reading response that is sent from the control units 18 in response to the customization setting request frame 98RR, and a customization setting response frame 100WA, forming a writing response that is sent from the control units 18 in response to the customization setting request frame 98WR, are defined as frames which are sent during the transmission process.

A frame header, which represents data included in the header HEADER of the frame format 80, comprises a frame identification code FC "EC (hexadecimal)" indicating the customization setting request frame 98 or the customization setting response frame 100, a destination address DA (the destination is represented by the physical address PA of the display unit 14 or each control unit 18 connected to the communication line 12, and the destination address DA is set to a broadcast address "00" when default settings are indicated), a source address SA (the source is represented by the physical address PA), and a data length code DLC represented by a value of 2 or 3 bytes.

A data field, which represents data included in the data field of the frame format 80, includes a first byte comprising a bit "7" serving as a flag bit, which is "0" if the frame is a request frame and "1" if the frame is a response frame, and a bit "6" serving as a flag bit, which is "0" if data (control characteristic values) are to be read from the first function information table 31 of the control unit 18 or "1" if data (control characteristic values) are to be written to the first function information table 31. If the frame is a reading request frame, then the bit "7" is set to "0" and the bit "6" is set to "0". If the frame is a writing request frame, then the bit "7" is set to "0" and the bit "6" is set to "1". If the frame is a reading response frame, then the bit "7" is set to "1" and the bit "6" is set to "0". If the frame is a writing response frame, then the bit "7" is set to "1" and the bit "6" is set to "1". The first byte of the data field also includes bits "5" through "0" which are all set to "0".

The data field also includes a second byte, wherein all the bits thereof represent menu numbers selected by the user during customization, and which are set to "0" when default settings are indicated. The data field further includes a third byte, wherein all the bits thereof represent control characteristic values that are used when it is requested to read or write control characteristic values, but not when the default settings are indicated.

FIG. 7 shows a user identification code frame 102 used for user identification. A transmission process is performed to send the user identification code frame 102 when the vehicle customizing system is wakened, the user identification code is changed, a customization function check request frame (see FIG. 8) is received, or when the user identification code frame 102 is periodically transmitted. In the normal mode, the user identification code frame 102 is periodically sent from the user identification unit 16 to the communication line 12, and confirmed by the display unit 14 and the control units 18.

A frame header comprises a frame identification code FC "F8" indicating the user identification code frame 102, a destination address DA which is set to a broadband address "00" representing all units (i.e., the display unit 14 and the control units 18) that are connected to the communication line 12, a source address SA which is set to the physical address PA "10" of the user identification unit 16, and a data length code DLC represented by a 1 byte value.

A data field includes a single byte corresponding to the data length code DLC, and comprises bits "7" through "5" representing a default setting "0", a user identification code "1", and a user identification code "2" (another user identification code "3" could also be possible depending on the number of transmitters or identification numbers that are used by the system), and bits "4" through "0", which are all set to "0".

The user identification code frame 102 used for user identification is transmitted only from the user identification unit 16 to which the receiver 52 is connected. In the present embodiment, as described above, the user identification code changes when the vehicle doors are unlocked by the keyless transmitter, and remains unchanged when the ignition switch 72 is turned on.

FIG. 8 shows a customization function check request frame 94, serving as a function information request signal that is used in a customization initializing process, which is carried out in a step prior to changing the customization settings in the customizing mode.

The customization function check request frame 94 is sent from the display unit 14, and used to request information as to whether or not customization functions (functions to be customized) have been stored in the first function information tables 31 of all control units 18 that are connected to the communication line 12.

A transmission process is performed to send the customization function check request frame 94, when customization function information is requested from the control units 18.

A frame header comprises a frame identification code FC "EA" indicating the customization function check request frame 94, a destination address DA which is set to a broadband address "00", a source address SA which is set to the physical address PA "01" of the display unit 14, and a data length code DLC represented by a value of 2 bytes.

A data field includes a single byte representing the frame identification code FC "EB" of a request frame, i.e., the customization function check response frame 96 shown in FIG. 9.

FIG. 9 shows a customization function check response frame 96, serving as a function information response signal that is used to return information to the display unit 14, depending on the menu number, as to whether or not customization functions corresponding to respective menu numbers have been stored in the first function information tables 31 of the respective control units 18, in response to the customization function check request frame 94 used during the customization initializing process. A transmission process is performed to send the customization function check response frame 96 in response to a request made by the customization function check request frame 94.

A frame header comprises a frame identification code FC "EB" indicating the customization function check response frame 96, a destination address DA which is set to the physical address PA "01" of the display unit 14, a source address SA which is set to its own physical address PA, and a data length code DLC represented by a value of 2 through 8 bytes depending on the number of menu numbers and functions.

A data field includes a first byte representing the unit number (physical address) PA of the control unit 18, and second through eighth bytes representing customization function information which are allocated in the order of menu numbers, to represent information ("1" or "0") as to whether or not there are functions to be customized that correspond to the menu numbers.

Transmission and return (response) actions of the frames 98, 100, 94 and 96 shall be described below.

First, transmission of the customization setting request frame 98 (see FIG. 6) and return of the customization setting response frame 100, which are implemented for changing customization settings, shall be described below with reference to FIGS. 10A through 10C.

User-customized settings are changed by sending and receiving requests (reading and writing requests) and responses (reading and writing responses), with respect to control characteristic values, between the display unit 14 and the control unit 18 whose settings are to be changed, through sending the customization setting request frame 98 and receiving a returned customization setting response frame 100.

As shown in FIG. 10B, the display unit 14 sends the customization setting request frame 98 to the communication line 12 at a certain time (see FIG. 10A). The control unit 18, which has received the customization setting request frame 98, confirms the menu number of the customization setting request frame 98. If the menu number is normal, then, as shown in FIG. 10C, the control unit 18 sends the customization setting response frame 100 to the display unit 14, within a timeout time T_CUSMAX of 300 ms, for example. If the display unit 14 does not receive the customization setting response frame 100 within a predetermined timeout time T_CUSOUT of 550 ms, for example, after it has sent the customization setting request frame 98, then the display unit 14 judges that a communication failure has occurred.

Transmission of the customization function check request frame 94 shown in FIG. 8 and return of the customization function check response frame 96 shown in FIG. 9, which are implemented during an initializing process for changing customization settings, shall be described below with reference to FIGS. 11A through 11C.

According to a customization function check, the display unit 14 investigates whether or not there are customization functions for the control units 18 connected to the communication line 12, using the customization function check request frame 94 and the customization function check response frame 96, during the initializing process for changing customization settings.

As shown in FIG. 11B, when the vehicle customizing system 10 enters the customizing mode, the display unit 14 transmits the customization function check request frame 94 through the communication line 12 for performing the customization function check (see FIG. 11A). The control unit 18, which has received the customization function check request frame 94, sends the customization function check response frame 96 to the display unit 14 within a predetermined time T_REQMAX of 10 ms, for example (see FIG. 11C).

The vehicle customizing system 10 according to the present embodiment is basically constructed and operates as described above. A user customization setting process performed by the vehicle customizing system 10, in accordance with the present embodiment, shall be described below with reference to FIG. 12.

The user customization setting process may be performed when the ignition switch 72 and the parking brake switch 73 are turned on. If a diagnostic process is currently being carried out using the diagnostic port 71, then the user customization setting process cannot be performed, even if the ignition switch 72 and the parking brake switch 73 are turned on.

In the user customization setting process, control characteristic values (setting numbers thereof) of the control units 18, which are settings for functions depending on the user identification codes stored in the first function information tables 31, are changed. If user identification codes that are periodically transmitted are not properly received during a predetermined time T_FSOUT of 500 ms, for example, then the user customization setting process will not be performed. If the display unit 14 detects reception of the user identification code "0" or detects a reception failure of the user identification codes, then the display unit 14 does not enter the customization setting mode. If the control unit 18, whose settings are to be changed, detects reception of the user identification code "0" or detects a reception failure of the user identification codes, then the control unit 18 does not respond to a request from the display unit 14.

Figure 12:
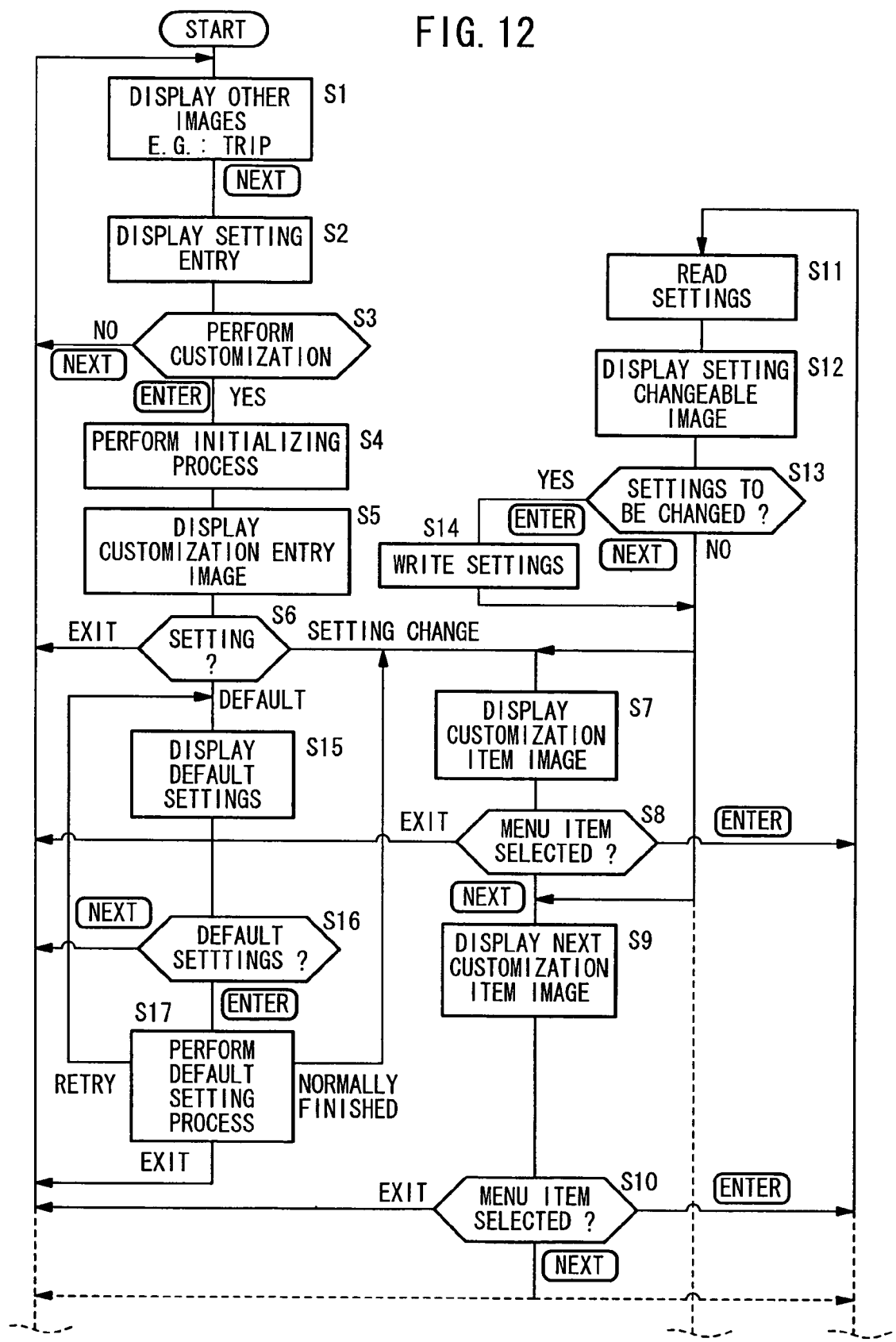
FIG. 12 is a flowchart of a customization setting sequence of the vehicle customizing system.

An example of the user customization setting process shall be described below with reference to FIG. 12.

In step S1, the NEXT button 46 is pressed while the display panel 42 displays an ordinary image, such as a trip meter image that displays driving information, including simultaneous mileage, while the motor vehicle is running, as well as an expected arrival time, or an image other than the image displayed during the customization setting mode, i.e., while the display panel 42 is in an ordinary mode. Then, in step S2, the image displayed on the display panel 42 changes to a customization setting (setting entry display) image 201, indicating the "MEMORY CUSTOMIZATION SETTING", as shown in FIG. 13A.

If the user customization setting process is to be performed at this time, then the ENTER button 47 is pressed in step S3, and the vehicle customizing system 10 enters the customizing mode. If the NEXT button 46 is pressed in step S3, then control goes back to step S1.

If the ENTER button 47 is pressed in step S3, an initializing process is performed in step S4. During the initializing process, function information, indicative of whether there are customization functions for the control units 18 connected to the communication line 12, is investigated.

As shown in FIG. 14A, the display unit 14 sends the customization function check request frame 94 for performing the customization function check through the communication line 12 in a broadcast mode, using the destination address PA="00" representing no specific address, i.e., representing all control units 18 and the user identification unit 16, which are connected to the communication line 12. As shown in FIG. 14B, the user identification unit 16 sends the user identification code frame 102, and the control units 18 send respective customization function check response frames 96, wherein the display unit 14 receives the frames 102 and 96. Depending on the unit number (physical address) PA in the data field of each of the customization function check response frames 96, function information, indicative of the presence or absence of functions with respect to the menu number of each of the control units 18, is stored in the reception data area 32$b$ of the second function information table 32 of the memory 48. Based on the stored information, a decision result as to whether a display character code is to be displayed on the display panel 42 or not, i.e., "DISPLAY" or "NO DISPLAY", is written into the image display result area 32$c$, as shown in FIG. 4. The image display result area 32$c$ indicates "NO DISPLAY" if there is no function corresponding to a menu number and/or if function information is not received within a predetermined time T_REQMAX=500 ms after the customization function check request frame 94 has been sent (e.g., in FIG. 4, when the control unit 18B suffers from a communication failure and the control unit 18D is not connected).

Stated otherwise, only those customization items (functions) for which the function presence/absence data thereof shown in FIG. 4 is "1" (indicating "PRESENCE") can be displayed as customization item images.

After the above customization function check, the customization entry image 202 shown in FIG. 13B is displayed on the display panel 42 in step S5. If the customization function check response frame 96 has not been received within the predetermined time T_REQMAX=500 ms, then an error display image "CUSTOMAZATION IMPOSSIBLE" 213, as shown in FIG. 13M, is displayed on the display panel 42.

The customization entry image 202 displays items of information based on the user identification code (see FIG. 7) written in the user identification code frame 102 and stored in the user identification code memory area 37E (e.g., "DRIVER1" based on the user identification code "1"), wherein "SETTING CHANGE", "ALL DEFAULT", and "EXIT" can be selected using the SELECT button 45. When "EXIT" is selected, the customization entry image 202 changes to the image displayed in step S1.

In step S6, the SELECT button 45 is pressed to move the arrow "→" vertically to a desired item displayed in the customization entry image 202, thereby selecting the item. When the ENTER button 47 is pressed, with the arrow "→" pointing to a selected item, then the selected item is determined and the process related to the item is performed.

If the item "SETTING CHANGE" in the customization entry image 202 is selected, then, in step S7, the image display result area 32c and the customized object function table 32a of the second function information table 32 are referred to. Then, "AUTOMATIC DOOR LOCK" (see FIGS. 2 through 4) at menu number "1", which is the first customization menu (customization function item) of the control unit 18A initially set for "DISPLAY" in the order of menu numbers, and "EXIT" are displayed in a customization item image 203 shown in FIG. 13C.

If the NEXT button 46 is pressed while the customization item image 203 is being displayed in step S8, then "AUTOMATIC DOOR UNLOCK" of the menu (function item) at menu number "3" is determined for "DISPLAY" the next time, and is displayed along with "EXIT" in the customization item image 204, as shown in FIG. 13D.

Subsequently, each time the NEXT button 46 is pressed, the menu number that is determined for "DISPLAY" the next time is displayed. When displaying of items related to the control unit 18A is finished, the menus of successive menu numbers, which are determined for "DISPLAY" with respect to the next control unit 18B, are successively displayed. When displaying of items related to the control unit 18B is finished, then "FRONT WINDSHIELD WIPER OPERATION" in the menu of the first menu number "1", which is determined for "DISPLAY" with respect to the control unit 18C, is displayed. After the menu for the final menu number has been determined for "DISPLAY" with respect to the control unit 18C and displayed, the item corresponding to menu number "1", with respect to the control unit 18A, is displayed once again.

In steps S8 and S10, if it is determined that "EXIT" has been selected, then control goes back to step S1.

In steps S8 and S10, if it is determined that a menu item to be customized has been selected, then the contents of the menu item for the control unit 18 that is to be customized are read out.

In step S11, for confirmation of the settings as present control characteristic values, as shown in FIG. 15A, the display unit 14 sends a customization setting request frame 98RR, which serves as a reading request, to the control unit 18 for which settings are to be changed. The frame header and data field of the customization setting request frame 98RR have written therein the physical address PA as the destination address DA of the control unit 18, the data length DLC=2, byte 1=00****** (reading request), and byte 2=a given menu number (see FIG. 6).

The control unit 18 whose settings are to be changed, and which has a physical address PA that has received the customization setting request frame 98RR, reads from the first function information table 31 thereof the customization control characteristic values (settings) corresponding to the user identification code stored in the user identification code memory area 37, and returns a customization setting response frame 100RA as a reading response, as shown in FIG. 15B. The frame header and data field of the customization setting response frame 100RA have written therein the physical address PA as the destination address DA of the display unit 14, the data length DLC=a value ranging from 3 to 8, byte 1=10****** (reading response), and byte 3=customization control characteristic values (settings).

The display unit 14 receives the customization setting response frame 100RA, which is sent as the reading response from the control unit 18.

In step S12, a setting changeable image 205, as shown in FIG. 13E, is displayed depending on the received control characteristic values (settings). The setting changeable image 205 corresponds to the customization item image 203.

In the setting changeable image 205, "OFF" implies that the automatic door locking function is not performed (a control characteristic of "NO"), "PARKING-POSITION INTERLOCKED" implies a function to automatically lock the vehicle doors when the shift position switch 75 is shifted from a parking position to a drive position that corresponds to a running position), and "SPEED-INTERLOCKED (15 km)" implies a function to automatically lock the vehicle doors when the vehicle speed reaches 15 km after the motor vehicle has started running (refer to the control characteristics for menu number 1, in the first function information table 31A shown in FIG. 2).

If the ENTER button 47 is pressed while the setting changeable image 205 is being displayed, or if the ENTER button 47 is pressed after the SELECT button 45 has been pressed in step S13 (e.g., if "PARKING-POSITION INTERLOCKED" in the setting changing image 206 shown in FIG. 13F is selected by the SELECT button 45, and then the ENTER button 47 is pressed to determine "PARKING-POSITION INTERLOCKED") then a "SETTINGS OK ?" image 207, for confirming whether the setting change should be performed or not, is displayed as shown in FIG. 13G. If the ENTER button 47 is pressed, settings for the control characteristic values are changed.

Settings for the control characteristic values are also changed when settings different from the present settings are selected by the user in the setting changeable image 205. For storing the new settings for the control unit 18, whose settings are to be changed, the display unit 14 sends a customization setting request frame 98WR, which serves as a writing request as shown in FIG. 16A, to the control unit 18 whose settings are to be changed.

When the control unit 18 whose settings are to be changed receives the customization setting request frame 98WR as a writing request addressed thereto, the control unit 18 changes and stores the settings for the control characteristic values (i.e., the setting numbers for the control characteristic values in the user identification code column), corresponding to the menu number specified by byte 2 in the data field of the customization setting request frame 98WR, and the user identification code stored in the user identification code memory area 37, in the first function information table 31A (see FIG. 2A) in the memory 24 thereof. Thereafter, the control unit 18 returns a customization setting response frame 100WA, as a writing response to the display unit 14. The display unit 14 receives the customization setting response frame 100WA, as a writing response from the control unit 18, and displays the setting image 206 shown in FIG. 13H, which is the same as the setting changing image 206 shown in FIG. 13F, depending on the received control characteristic values (settings). Modification of the control characteristic values (settings) within the control characteristic value data area 31Ab, of the "AUTOMATIC DOOR LOCK" function at menu number "1" for the user identification code "1", is now completed.

The above process sequence, from steps S7 through S14, may be repeated in order to change the settings of other functions.

When modification of the settings has been completed, or when the NEXT button 46 in the setting changeable image is pressed, the previously selected customization item image is displayed again.

If the SELECT button 45 is pressed to select "ALL DEFAULT" in step S6, while the customization entry image 202 shown in FIG. 13B is being displayed on the display panel 42, then the ENTER button 47 may be pressed to display the image 209 shown in FIG. 13I, for confirming whether the default settings are acceptable or not in step S15.

If the ENTER button 47 is pressed while the image 209 is being displayed in step S16, then a default setting process is performed in step S17.

In the default setting process, the display unit 14 sends a customization setting request frame 98WR, thereby requesting all the control units 18 to write default settings, as shown in FIG. 17A. In response to the customization setting request frame 98WR, each of the control units 18 confirms the menu number indicated by the display unit 14 (see FIG. 2), and rewrites the setting number of the control characteristic values of the user identification code "1" or "2", which is stored in the user identification code memory area 37 within the control characteristic value data area 31Ab of the first function information table 31A, into the setting number "010 . . . " of the control characteristic values of the user identification code "0". Thereafter, each of the control units 18 returns a customization setting response frame 100WA, as a writing response to the display unit 14.

The display unit 14 receives the customization setting response frame 100WA as a writing response, which is sent from the control unit 18 whose settings are to be changed. After having received the customization setting response frames 100WA from all control units 18 which have sent the customization setting response frames 100WA, the display unit 14 displays a customization entry image 210 having "ALL DEFAULT" selected therein, as shown in FIG. 13J.

With respect to the writing request and the writing response for the default settings, the menu number is set to "0" (see the second byte in the data field shown in FIG. 6). Therefore, the control unit 18 whose settings are to be changed, and which has received the customization setting request frame 98WR as a writing request with the menu number "0", changes only the corresponding control characteristic values to default control characteristic values, depending on the received and stored user identification code. Customization items to be changed to default settings may be prescribed in each of the control units 18.

Assuming that the default setting process finishes normally, control then returns to the setting modification process, in step S5 or step S7, or to the ordinary mode in step S1. However, if the display unit 14 fails to receive any response to the customization setting request frame 98WR, as a writing request for the default settings, within the timeout time T_CUSMAX during the default setting process in step S17, then as shown in FIGS. 18 and 19, the display unit 14 displays the confirmation image 211 shown in FIG. 13K, in order to determine whether an "ERROR" is to be displayed, or whether a "RETRY" for setting "ALL DEFAULT" is to be performed.

If the ENTER button 47 is pressed while the confirmation image 211 with "RETRY" selected is displayed, control returns to step S15, in order to display the default setting image 209. If the NEXT button 46 is pressed while the confirmation image 211 with "ERROR" selected is displayed, control returns to step S1, in order to display other additional images.

Although for the sake of brevity such actions have not been illustrated in the flowcharts, as shown in FIGS. 19A and 19B, the display unit 14 waits for a customization setting response frame 100RA, as a reading response, or a customization setting response frame 100WA, as a writing response, from the control unit 18 whose settings are to be changed, wherein such actions are in response to a customization setting request frame 98RR, as a reading request, or a customization setting request frame 98WR, as a writing request, which are sent to the control unit 18 in step S11 or S14, with a maximum timeout time of T_CUSTOM. If the display unit 14 fails to receive a customization setting response frame, 100RA or 100WA, within the maximum timeout time T_CUSTOM, then the display unit 14 displays a confirmation image 212, as shown in FIG. 13L, for determining whether an "ERROR" shall be displayed, or whether a "RETRY" for setting the "AUTOMATIC DOOR LOCK" shall be performed. If the control unit 18 whose settings are to be changed receives a customization setting request frame 98 in which the menu number or the control characteristic values (settings) thereof are incorrect, then the control unit 18 does not send any response.

FIG. 20 shows a sequence of changing images, i.e., the customization entry image 202, the customization item images 203 and 204, and the setting changing images 205 and 206, which can be selected by the control switch assembly 44. Since the hierarchical range of the images is small, the sequence shown in FIG. 20 provides an excellent human interface.

According to the above embodiment, as described above, in order to change the settings of control characteristic values, which pertain to the function of a given control unit 18, to settings which are favored by the user, the display unit 14 displays, on the display panel 42, functions depending on a user identification code that is stored in the user identification unit 16 from the transmitter 54 carried by a legitimate user, and which is received via the receiver 52, together with the control characteristics that are presently set for such functions. Based on the displayed functions and control characteristics, the user operates the control switch assembly 44 in order to change the control characteristic values through the display unit 14, so that modified control characteristic values can be stored in the first function information table 31 of the control unit 18 which directly performs the function.

In this manner, control characteristic values pertaining to functions of the control unit 18 can easily be changed to values favored by the user, by means of the display unit 14 and the transmitter 54 carried by a legitimate user.

Furthermore, the operations of the display unit 14 and control unit 18 are appropriately distributed, so that when the control unit 18 is activated, the function of the control unit 18 can immediately be controlled according to control characteristic values that are stored in the first function information table 31A thereof and which can be set to values favored by the user. Therefore, the time required after the control unit 18 has been activated until the control unit 18 performs the function is shortened. Stated otherwise, the time required to establish functional settings, so as to match the settings favored by the user, can be reduced, thereby improving responsiveness.

Furthermore, even in the event of a communication failure, the control unit 18 is capable on its own of controlling the object 22, so as to perform the function thereof based on the control characteristic values stored in the first function information table 31A. Stated otherwise, since the control unit 18 inherently stores the control characteristic values, the vehicle customizing system operates highly reliably in the event of a communication failure between the control unit 18 and the display unit 14.

Although certain preferred embodiments of the present invention have been shown and described in detail, it should be understood that various changes and modifications may be made therein without departing from the scope of the appended claims.

What is claimed is:

1. A vehicle customizing system comprising:
    a plurality of control units for performing respective functions based on respective user-definable control characteristic values; and
    a display unit having an input means connected to said control units through a communication line, for receiving inputs from a user to change said control characteristic values;
    said control units each having respective first memory means for storing function information concerning said respective functions, and a control characteristic value pertaining to said functions, wherein each one of said control units performs said respective functions based on the control characteristic value stored in said respective first memory means;
    wherein said display unit displays said function information and said control characteristic value, which are received from said control unit through said communication line, and sends a changed control characteristic value, changed by said input means, to said control unit through said communication line, said control unit storing the changed control characteristic value in said first memory means.

2. A vehicle customizing system according to claim 1, wherein said display unit has second memory means for storing a table of information as to all the functions of the control units which are connectable to said communication line, and determines an image to be displayed based on said table and said function information that is received through said communication line from one of said control units which is connected to said communication line.

3. A vehicle customizing system according to claim 1, further comprising a user identification unit connected to said communication line and having user identification code memory means for storing user identification information for identifying the user;
    wherein one of said control units stores said control characteristic value depending on said user identification information in said respective first memory means, and sends said control characteristic value stored in said respective first memory means to said display unit depending on said user identification information.

4. A vehicle customizing system according to claim 3, wherein one of said control units sends said control characteristic value to said display unit only when said user identification information is stored in said respective first memory means.

5. A vehicle customizing system comprising:
    a control unit for performing a function based on a control characteristic value; and
    a display unit having an input means connected to said control unit through a communication line, for changing said control characteristic value;
    said control unit having first memory means for storing function information concerning said function, and a control characteristic value pertaining to said function, wherein said control unit performs said function based on the control characteristic value stored in said first memory means;
    a plurality of control units connectable to said communication line, said control units having different functions depending on specifications thereof;
    a user identification unit connected to said communication line and having user identification code memory means for storing user identification information for identifying the user;
    wherein said display unit displays said function information and said control characteristic value, which are received from said control unit through said communication line, and sends a changed control characteristic value, changed by said input means, to said control unit through said communication line, said control unit storing the changed control characteristic value in said first memory means;
    wherein said display unit has second memory means for storing a table of information as to all the functions of the control units which are connectable to said communication line, and determines an image to be displayed based on said table and said function information that is received through said communication line from said control unit which is connected to said communication line; and
    wherein said control unit stores said control characteristic value in said first memory means depending on said user identification information, and sends said control characteristic value stored in said first memory means to said display unit depending on said user identification information.

6. A vehicle customizing system according to claim 5, wherein one of said control units sends said control characteristic value to said display unit only when said user identification information is further stored in said respective first memory means.

7. A vehicle customizing system comprising:
    a control unit for performing a function based on a control characteristic value; and
    a display unit having an input means connected to said control unit through a communication line, for changing said control characteristic value;
    said control unit having first memory means for storing function information concerning said function, and a control characteristic value pertaining to said function, wherein said control unit performs said function based on the control characteristic value stored in said first memory means;
    wherein said display unit displays said function information and said control characteristic value, which are received from said control unit through said communication line, and sends a changed control characteristic value, changed by said input means, to said control unit through said communication line, said control unit storing the changed control characteristic value in said first memory means; and
    wherein when said display unit is brought into a state capable of changing the control characteristic value stored in said first memory means of said control unit, said display unit sends a function information request signal for requesting said control unit to send said function information concerning the function of said control unit through said communication line, and said display unit recognizes said control unit connected to said communication line and the function of said control unit and determines an image to be displayed based on a function information response signal including said function information, which is received from said control unit within a predetermined time after said function information request signal has been sent.

8. A vehicle customizing system according to claim 7, wherein when the function displayed on a display screen of said display unit is selected by said input means, said display unit sends a control characteristic value request signal for requesting the control unit having the selected function to send the control characteristic value of the function, and displays the control characteristic value returned from the control unit having the selected function, and when said control characteristic value is changed by said input means, said display unit sends the changed control characteristic value through said communication line for said first memory means to store the changed control characteristic value.

9. A vehicle customizing system according to claim 8, further comprising a user identification unit connected to said communication line, for storing user identification information for identifying the user; wherein said user identification unit sends said user identification information through said communication line; and wherein said control unit stores said user identification information in said first memory means, and when said control unit receives said control characteristic value request signal from said display unit through said communication line, said control unit sends said control characteristic value stored in said first memory means to said display unit depending on said user identification information.

10. A vehicle customizing system according to claim 7, wherein said first memory means of said control unit stores a default control characteristic value, which is preset as a factory setting with respect to the function of said control unit, and the present control characteristic value is changed to said default control characteristic value and the default control characteristic value is stored when a default setting instruction is received from said display unit through said communication line.

11. A vehicle customizing system comprising:
a control unit for performing a function based on a control characteristic value; and
a display unit having an input means connected to said control unit through a communication line, for changing said control characteristic value;
said control unit having first memory means for storing function information concerning said function, and a control characteristic value pertaining to said function, wherein said control unit performs said function based on the control characteristic value stored in said first memory means;
a plurality of control units connectable to said communication line, said control units having different functions depending on specifications thereof;
wherein said display unit displays said function information and said control characteristic value, which are received from said control unit through said communication line, and sends a changed control characteristic value, changed by said input means, to said control unit through said communication line, said control unit storing the changed control characteristic value in said first memory means;
wherein said display unit has second memory means for storing a table of information as to all the functions of the control units which are connectable to said communication line, and determines an image to be displayed based on said table and said function information that is received through said communication line from said control unit which is connected to said communication line;
wherein when said display unit is brought into a state capable of changing the control characteristic value stored in said first memory means of said control unit, said display unit sends a function information request signal for requesting said control unit to send said function information concerning the function of said control unit through said communication line, and said display unit recognizes said control unit connected to said communication line and the function of said control unit and determines an image to be displayed based on a function information response signal including said function information, which is received from said control unit within a predetermined time after said function information request signal has been sent.

12. A vehicle customizing system according to claim 11, wherein when the function displayed on a display screen of said display unit is selected by said input means, said display unit sends a control characteristic value request signal for requesting the control unit having the selected function to send the control characteristic value pertaining to the function, said display unit displays the control characteristic value returned from the control unit having the selected function, and when said control characteristic value is changed by said input means, said display unit sends the changed control characteristic value through said communication line, and said first memory means stores the changed control characteristic value.

13. A vehicle customizing system according to claim 12, further comprising a user identification unit connected to said communication line, for storing user identification information for identifying the user;
wherein said user identification unit sends said user identification information through said communication line; and
wherein said control unit stores said user identification information in said first memory means, and when said control unit receives said control characteristic value request signal from said display unit through said communication line, said control unit sends said control characteristic value stored in said first memory means to said display unit depending on said user identification information.

14. A vehicle customizing system according to claim 11, wherein said first memory means of said control unit stores a default control characteristic value, which is preset as a factory setting with respect to the function of said control unit, and the present control characteristic value is changed to said default control characteristic value and the default control characteristic value is stored when a default setting instruction is received from said display unit through said communication line.

15. A vehicle customizing system comprising:
a control unit for performing a function based on a control characteristic value; and
a display unit having an input means connected to said control unit through a communication line, for changing said control characteristic value;
said control unit having first memory means for storing function information concerning said function, and a control characteristic value pertaining to said function, wherein said control unit performs said function based on the control characteristic value stored in said first memory means;

wherein said display unit displays said function information and said control characteristic value, which are received from said control unit through said communication line, and sends a changed control characteristic value, changed by said input means, to said control unit through said communication line, said control unit storing the changed control characteristic value in said first memory means;

wherein said first memory means of said control unit stores a default control characteristic value, which is preset as a factory setting with respect to the function of said control unit, and the present control characteristic value is changed to said default control characteristic value and the default control characteristic value is stored when a default setting instruction is received from said display unit through said communication line.

* * * * *